(12) United States Patent
Lee et al.

(10) Patent No.: US 11,775,455 B2
(45) Date of Patent: *Oct. 3, 2023

(54) STORAGE DEVICE FOR INTERFACING WITH HOST AND METHOD OF OPERATING THE HOST AND THE STORAGE DEVICE

(71) Applicant: SAMSUNG ELECTRONICS CO., LTD., Suwon-si (KR)

(72) Inventors: Young-Min Lee, Seoul (KR); Sung-Ho Seo, Seoul (KR); Hwa-Seok Oh, Yongin-si (KR); Kyung-Phil Yoo, Seoul (KR); Seong-Yong Jang, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 18/091,452

(22) Filed: Dec. 30, 2022

(65) Prior Publication Data

US 2023/0144485 A1 May 11, 2023

Related U.S. Application Data

(63) Continuation of application No. 17/359,864, filed on Jun. 28, 2021, now Pat. No. 11,573,915, which is a
(Continued)

(30) Foreign Application Priority Data

Jul. 31, 2017 (KR) .................. 10-2017-0097133

(51) Int. Cl.
*G06F 13/16* (2006.01)
*G06F 3/06* (2006.01)
(Continued)

(52) U.S. Cl.
CPC .......... *G06F 13/1673* (2013.01); *G06F 3/061* (2013.01); *G06F 3/0634* (2013.01);
(Continued)

(58) Field of Classification Search
CPC .... G06F 13/1673; G06F 13/42; G06F 13/385; G06F 3/061; G06F 13/0634; G06F 13/0679; G06F 13/1642; G06F 2213/16
(Continued)

(56) References Cited

U.S. PATENT DOCUMENTS 6,564,271 B2    5/2003  Micalizzi
7,469,309 B1   12/2008  Duncan
(Continued)

FOREIGN PATENT DOCUMENTS

CN    102075401 A    5/2011
CN    102609378 A    7/2012
(Continued)

OTHER PUBLICATIONS

Jesd223, "Universal Flash Storage (UFS) Host Controller Interface," Jedec Solid State Technology Association, Aug. 2011.
(Continued)

*Primary Examiner* — Christopher B Shin
(74) *Attorney, Agent, or Firm* — Fish & Richardson P.C.

(57) ABSTRACT

A method of operating a storage device includes receiving, from a host, a first packet containing a buffer address indicating a location of a data buffer selected from among a plurality of data buffers in the host, parsing the buffer address from the first packet, and transmitting a second packet containing the buffer address to the host in response to the first packet.

20 Claims, 32 Drawing Sheets

Related U.S. Application Data continuation of application No. 16/801,267, filed on Feb. 26, 2020, now Pat. No. 11,080,217, which is a continuation of application No. 15/961,920, filed on Apr. 25, 2018, now Pat. No. 10,599,591.

(51) Int. Cl.
  *G06F 13/42* (2006.01)
  *G06F 13/38* (2006.01)

(52) U.S. Cl.
  CPC ........ *G06F 3/0679* (2013.01); *G06F 13/1642* (2013.01); *G06F 13/385* (2013.01); *G06F 13/42* (2013.01); *G06F 2213/16* (2013.01)

(58) Field of Classification Search
  USPC ........................................................ 710/105
  See application file for complete search history.

(56) References Cited

U.S. PATENT DOCUMENTS

| | | |
|---|---|---|
| 7,894,480 B1 | 2/2011 | Wang et al. |
| 8,386,644 B1 | 2/2013 | Mercer et al. |
| 9,176,673 B2 | 11/2015 | Watanabe |
| 9,459,687 B2 | 10/2016 | Park et al. |
| 9,959,227 B1 | 5/2018 | Diamant |
| 10,496,281 B2 | 12/2019 | Jeong et al. |
| 2004/0024915 A1 | 2/2004 | Abe |
| 2004/0122988 A1 | 6/2004 | Han et al. |
| 2005/0216616 A1 | 9/2005 | Eldar et al. |
| 2010/0070655 A1 | 3/2010 | Chamley et al. |
| 2010/0088232 A1 | 4/2010 | Gale |
| 2011/0078342 A1 | 3/2011 | Siddabathuni |
| 2013/0047212 A1 | 2/2013 | Fang et al. |
| 2013/0103866 A1 | 4/2013 | Gao et al. |
| 2014/0244907 A1 | 8/2014 | Watanabe |
| 2014/0244908 A1 | 8/2014 | Kim et al. |
| 2014/0281136 A1 | 9/2014 | Wakrat et al. |
| 2014/0310536 A1 | 10/2014 | Shacham |
| 2015/0006841 A1 | 1/2015 | Chen et al. |
| 2015/0153963 A1 | 6/2015 | Rewitz |
| 2015/0278118 A1 | 10/2015 | Lee et al. |
| 2015/0279437 A1 | 10/2015 | Kitada |
| 2015/0355965 A1 | 12/2015 | Peddle |
| 2016/0011790 A1 | 1/2016 | Rostoker et al. |
| 2016/0070407 A1 | 3/2016 | Jeon et al. |
| 2016/0070470 A1 | 3/2016 | Uchida |
| 2016/0077994 A1 | 3/2016 | Hamada et al. |
| 2016/0085585 A1 | 3/2016 | Chen |
| 2016/0162416 A1 | 6/2016 | Boyd et al. |
| 2016/0371004 A1 | 12/2016 | Choi |
| 2017/0024341 A1 | 1/2017 | Davda et al. |
| 2017/0031601 A1 | 2/2017 | Arai et al. |
| 2017/0068456 A1 | 3/2017 | Toge |
| 2017/0068564 A1 | 3/2017 | Lubsey et al. |
| 2017/0075813 A1 | 3/2017 | Kaburaki |
| 2017/0075828 A1 | 3/2017 | Monji et al. |
| 2017/0116139 A1 | 4/2017 | Mcvay |
| 2017/0270050 A1 | 9/2017 | Jin |
| 2019/0012193 A1 | 1/2019 | Van Leeuwen et al. |
| 2019/0044879 A1 | 2/2019 | Richardson et al. |
| 2019/0303304 A1 | 10/2019 | Lee et al. |

FOREIGN PATENT DOCUMENTS

| | | |
|---|---|---|
| CN | 104007935 A | 8/2014 |
| CN | 105589661 A | 5/2016 |
| KR | 10201500143708 A | 12/2015 |

OTHER PUBLICATIONS

Korean First Office Action dated Aug. 24, 2021 Cited in Korean Patent Application No. 10-2017-0097133.
Chinese First Office Action dated Mar. 23, 2023, Cited in Chinese Patent Application No. 201810418379.6.

FIG. 11A

| CMD UPIU ||||
|---|---|---|---|
| 0<br>xx00 0001b | 1<br>FLAGS | 2<br>LUN | 3<br>TASK TAG |
| 4<br>IID / COMMAND SET TYPE | 5<br>RESERVED | 6<br>RESERVED | 7<br>RESERVED |
| 8<br>TOTAL EHS LENGTH (00h) | 9<br>RESERVED | 10 (MSB)<br>DATA SEGMENT LENGTH (0000h) | 11 (LSB) |
| 12 (MSB) | 13<br>EXPECTED DATA TRANSFER LENGTH | 14 | 15 (LSB) |
| 16<br>CDB[0] | 17<br>CDB[1] | 18<br>CDB[2] | 19<br>CDB[3] |
| 20<br>CDB[4] | 21<br>CDB[5] | 22<br>CDB[6] | 23<br>CDB[7] |
| 24<br>CWA | 25<br>RESERVED | 26<br>RESERVED | 27<br>CWA_LENGTH |
| 28~31<br>HOST MEMORY BUFFER ADDRESS ||||

FIG. 11B

| DATA IN UPIU | | | | |
|---|---|---|---|---|
| 0<br>xx10 0010b | 1<br>FLAGS | 2<br>LUN | 3<br>TASK TAG | ⎫<br>⎪ |
| 4<br>IID \| RESERVED | 5<br>RESERVED | 6<br>RESERVED | 7<br>RESERVED | ⎪ |
| 8<br>TOTAL EHS LENGTH (00H) | 9<br>RESERVED | 10 (MSB)<br>DATA SEGMENT LENGTH | 11 (LSB) | ⎬ H |
| 12 (MSB) | 13 | 14 | 15 (LSB) | ⎪ |
| | DATA BUFFER OFFSET | | | ⎪ |
| 16 (MSB) | 17 | 18 | 19 (LSB) | ⎪ |
| | DATA TRANSFER COUNT | | | ⎪ |
| 20 | 21 | 22 | 23 | ⎭ |
| | RESERVED | | | |
| 24<br>CWA | 25<br>RESERVED | 26<br>RESERVED | 27<br>CWA_LENGTH | ⎫ RESERVED |
| 28~31 | HOST MEMORY BUFFER ADDRESS | | | ⎭ |
| k<br>DATA[0] | k+1<br>DATA[1] | k+2<br>DATA[2] | k+3<br>DATA[3] | ⎫<br>⎪ |
| . . . | . . . | . . . | . . . | ⎬ DATA |
| k+LENGTH-4<br>DATA[LENGTH-4] | k+LENGTH-3<br>DATA[LENGTH-3] | k+LENGTH-2<br>DATA[LENGTH-2] | k+LENGTH-1<br>DATA[LENGTH-1] | ⎭ |

FIG. 13

| RRT UPIU_1 | | | | | | | |
|---|---|---|---|---|---|---|---|
| 0 xx11 0001b | | 1 FLAGS | | 2 LUN | | 3 TASK TAG | |
| 4 IID | RESERVED | 5 RESERVED | | 6 RESERVED | | 7 RESERVED | |
| 8 TOTAL EHS LENGTH (00h) | | 9 RESERVED | | 10 (MSB) DATA SEGMENT LENGTH (0000h) | | 11 (LSB) | |
| 12 (MSB) | | 13 DATA BUFFER OFFSET | | 14 | | 15 (LSB) | |
| 16 (MSB) | | 17 DATA TRANSFER COUNT | | 18 | | 19 (LSB) | |
| 20 | | 21 RESERVED | | 22 | | 23 | |
| 24 CWA | | 25 RESERVED | | 26 RESERVED | | 27 CWA_LENGTH | |
| 28~31 Host Memory Buffer Address_1 | | | | | | | |

Brace H covers rows 0–23. Brace RESERVED covers rows 24–31.

FIG. 19

| | | | | |
|---|---|---|---|---|
| CMD UPIU | | | | |
| 0<br>xx00 0001b | 1<br>FLAGS | 2<br>LUN | 3<br>TASK TAG | |
| 4<br>IID \| COMMAND SET TYPE | 5<br>RESERVED | 6<br>RESERVED | 7<br>RESERVED | |
| 8    3h<br>TOTAL EHS LENGTH | 9<br>RESERVED | 10    (MSB)<br>DATA SEGMENT LENGTH (0000h) | 11    (LSB) | |
| 12    (MSB) | 13    20000h=128KB<br>EXPECTED DATA TRANSFER LENGTH | | 15    (LSB) | H |
| 16  2Ah=WRITE<br>CDB[0] | 17<br>CDB[1] | 18<br>CDB[2] | 19<br>CDB[3] | |
| 20<br>CDB[4] | 21<br>CDB[5] | 22<br>CDB[6] | 23<br>CDB[7] | |
| 24<br>CDB[8] | 25<br>CDB[9] | 26<br>CDB[10] | 27<br>CDB[11] | |
| 28<br>CDB[12] | 29<br>CDB[13] | 30<br>CDB[14] | 31<br>CDB[15] | |
| 0  EHS_TYPE<br>2h:CWA | 1<br>RESERVED | 2<br>RESERVED | 3  EHS_LENGTH<br>3h:12B | |
| 4<br>RESERVED | 5<br>RESERVED | 6<br>RESERVED | 7<br>RESERVED | EHS FIELD |
| EHS DATA FIELD (HOST MEMORY BUFFER ADDRESS 1, 0x40C0_0000) | | | | |

FIG. 20A

| RTT UPIU_1 | | | | | | | |
|---|---|---|---|---|---|---|---|
| 0 xx11 0001b | | 1 FLAGS | | 2 LUN | | 3 TASK TAG | |
| 4 IID | RESERVED | 5 RESERVED | | 6 RESERVED | | 7 RESERVED | |
| 8 3h TOTAL EHS LENGTH | | 9 RESERVED | | 10 (MSB) DATA SEGMENT LENGTH (0000h) | | 11 (LSB) | |
| 12 (MSB) | | 13 0h DATA BUFFER OFFSET | | | | 15 (LSB) | |
| 16 (MSB) | | 17 8000h DATA TRANSFER COUNTER | | | | 19 (LSB) | |
| 20 | | 21 | | 22 RESERVED | | 23 | |
| 24 | | 25 | | 26 RESERVED | | 27 | |
| 28 | | 29 | | 30 RESERVED | | 31 | |
| 0 EHS_TYPE 2h:CWA | | 1 RESERVED | | 2 RESERVED | | 3 EHS_LENGTH 3h:12B | |
| 4 RESERVED | | 5 RESERVED | | 6 RESERVED | | 7 RESERVED | |
| EHS DATA FIELD (HOST MEMORY BUFFER ADDRESS 1, 0x40C0_0000) | | | | | | | |

H = rows 0–31
EHS FIELD = last three rows

FIG. 20B

| RTT UPIU_2 |||||
|---|---|---|---|---|
| 0<br>xx11 0001b | 1<br>FLAGS | 2<br>LUN | 3<br>TASK TAG | }H |
| 4<br>IID \| RESERVED | 5<br>RESERVED | 6<br>RESERVED | 7<br>RESERVED | |
| 8    3h<br>TOTAL EHS LENGTH | 9<br>RESERVED | 10   (MSB)<br>DATA SEGMENT | 11   (LSB)<br>LENGTH (0000h) | |
| 12   (MSB) | 13   8000h<br>DATA BUFFER OFFSET || 15   (LSB) | |
| 16   (MSB) | 17   8000h<br>DATA TRANSFER COUNTER || 19   (LSB) | |
| 20 | 21 | 22<br>RESERVED | 23 | |
| 24 | 25 | 26<br>RESERVED | 27 | |
| 28 | 29 | 30<br>RESERVED | 31 | |
| 0  EHS_TYPE<br>   2h:CWA | 1<br>RESERVED | 2<br>RESERVED | 3  EHS_LENGTH<br>   3h:12B | }EHS FIELD |
| 4<br>RESERVED | 5<br>RESERVED | 6<br>RESERVED | 7<br>RESERVED | |
| EHS DATA FIELD (HOST MEMORY BUFFER ADDRESS 1, 0x40C0_0000) |||| |

FIG. 21A

| RTT UPIU_1 ||||
|---|---|---|---|
| 0<br>xx11 0001b | 1<br>FLAGS | 2<br>LUN | 3<br>TASK TAG |
| 4<br>IID \| RESERVED | 5<br>RESERVED | 6<br>RESERVED | 7<br>RESERVED |
| 8    3h<br>TOTAL EHS LENGTH | 9<br>RESERVED | 10    (MSB)<br>DATA SEGMENT LENGTH (0000h) | 11    (LSB) |
| 12   (MSB) | 13<br>DATA BUFFER OFFSET | 0h | 15   (LSB) |
| 16   (MSB) | 17<br>DATA TRANSFER COUNTER | 8000h | 19   (LSB) |
| 20 | 21 | 22 | 23 |
|  |  | RESERVED |  |
| 24 | 25 | 26 | 27 |
|  |  | RESERVED |  |
| 28 | 29 | 30 | 31 |
|  |  | RESERVED |  |
| 0  EHS_TYPE<br>2h:CWA | 1<br>RESERVED | 2<br>RESERVED | 3  EHS_LENGTH<br>3h:12B |
| 4<br>RESERVED | 5<br>RESERVED | 6<br>RESERVED | 7<br>RESERVED |
| EHS DATA FIELD (HOST MEMORY BUFFER ADDRESS1_1, 0x40C0_0000) ||||

H = header rows (0–31); EHS FIELD = lower rows.

FIG. 21B

| RTT UPIU_2 ||||
|---|---|---|---|
| 0<br>xx11 0001b | 1<br>FLAGS | 2<br>LUN | 3<br>TASK TAG |
| 4<br>IID \| RESERVED | 5<br>RESERVED | 6<br>RESERVED | 7<br>RESERVED |
| 8     3h<br>TOTAL EHS LENGTH | 9<br>RESERVED | 10   (MSB)<br>DATA SEGMENT | 11   (LSB)<br>LENGTH (0000h) |
| 12   (MSB) | 13   8000h<br>DATA BUFFER | OFFSET | 15   (LSB) |
| 16   (MSB) | 17   8000h<br>DATA TRANSFER | COUNTER | 19   (LSB) |
| 20 | 21 | 22<br>RESERVED | 23 |
| 24 | 25 | 26<br>RESERVED | 27 |
| 28 | 29 | 30<br>RESERVED | 31 |

} H

| 0  EHS_TYPE<br>2h:CWA | 1  RESERVED | 2  RESERVED | 3  EHS_LENGTH<br>3h:12B |
|---|---|---|---|
| 4  RESERVED | 5  RESERVED | 6  RESERVED | 7  RESERVED |
| EHS DATA FIELD (HOST MEMORY BUFFER ADDRESS1_2, 0x40C0_8000) ||||

} EHS FIELD

STORAGE DEVICE FOR INTERFACING
WITH HOST AND METHOD OF OPERATING
THE HOST AND THE STORAGE DEVICE

CROSS-REFERENCE TO RELATED
APPLICATION

This is a Continuation of U.S. application Ser. No. 17/359,864, filed Jun. 28, 2021, which is a Continuation of U.S. application Ser. No. 16/801,267, filed Feb. 26, 2020, which is a Continuation of U.S. application Ser. No. 15/961,920, filed Apr. 25, 2018, which claims the benefit of Korean Patent Application No. 10-2017-0097133, filed on Jul. 31, 2017, in the Korean Intellectual Property Office, the disclosure of which is incorporated herein in its entirety by reference.

BACKGROUND

The disclosure relates to a method of operating a host and a storage device, and more particularly, to a storage device for interfacing with a host and a method of operating the host and the storage device.

A non-volatile memory device can retain data stored therein even when power is cut off. Recently, storage devices, such as an embedded multi-media card (eMMC), a universal flash storage (UFS), a solid-state drive (SSD), and a memory card, which include flash-based non-volatile memory, have been widely used. Storage devices are useful for storing or moving a large amount of data.

A data processing system including a storage device may be called a storage system. A storage system may include a host and a storage device. The host and the storage device may be connected through various interface standards and need to be improved with respect to data processing performance by reducing overhead of data processing operations, such as a read operation and a write operation, during interfacing.

SUMMARY

The disclosure provides a method of operating a host and a storage device to increase data processing performance by reducing overhead of data processing between the host and the storage device.

According to an aspect of the disclosure, there is provided a method of operating a storage device. The method includes receiving, from a host, a first packet including a buffer address indicating a location of a data buffer selected from among a plurality of data buffers in the host. The buffer address is parsed from the first packet. A second packet including the buffer address is transmitted to the host in response to the first packet.

According to another aspect of the disclosure, there is provided a storage device having a memory core and a storage controller. The memory core is configured to store data in a non-volatile manner. The storage controller is configured to interface with a host outside, to manage buffer addresses for a plurality of data buffers comprised in the host, to include a buffer address indicating a location of at least one data buffer in a packet, and to transmit the packet to the host when the packet is for requesting access to the at least one data buffer.

According to another aspect of the disclosure, there is provided a method of operating a host. The method includes receiving a first packet from a storage device, the first packet containing a first buffer address indicating a location of a data buffer selected from among a plurality of data buffers in the host. The first buffer address is parsed from the first packet. And data in a data buffer is accessed at a location indicated by the first buffer address which has been parsed.

According to another aspect of the disclosure, there is provided a method executed by a host for communicating with a nonvolatile memory device. The method includes receiving, from the nonvolatile memory device, a first packet comprising first information for identifying a first address within a data buffer. In response to receiving the first packet, the first address is accessed using the first information.

BRIEF DESCRIPTION OF THE DRAWINGS

Embodiments of the disclosure will be more clearly understood from the following detailed description taken in conjunction with the accompanying drawings in which:

FIG. 10 and FIGS. 11A and 11B are diagrams of a data read operation and packets involved in a UFS interface, according to an embodiment of the disclosure;

FIGS. 12 and 13 are diagrams of a data write operation and packets involved in the UFS interface, according to an embodiment of the disclosure;

FIG. 19 illustrates a command (CMD) UPIU for a data write operation according to an embodiment of the disclosure;

FIG. 20A shows an example of an RTT UPIU corresponding to the CMD UPIU shown in FIG. 19 according to an embodiment of the disclosure;

FIG. 20B shows another example of an RTT UPIU corresponding to the CMD UPIU shown in FIG. 19 according to another embodiment of the disclosure;

FIG. 21A shows another example of an RTT UPIU corresponding to the CMD UPIU shown in FIG. 19, according to another embodiment of the disclosure;

FIG. 21B shows another example of an RTT UPIU corresponding to the CMD UPIU shown in FIG. 19, according to another embodiment of the disclosure;

DETAILED DESCRIPTION OF THE EMBODIMENTS

Figure 1:
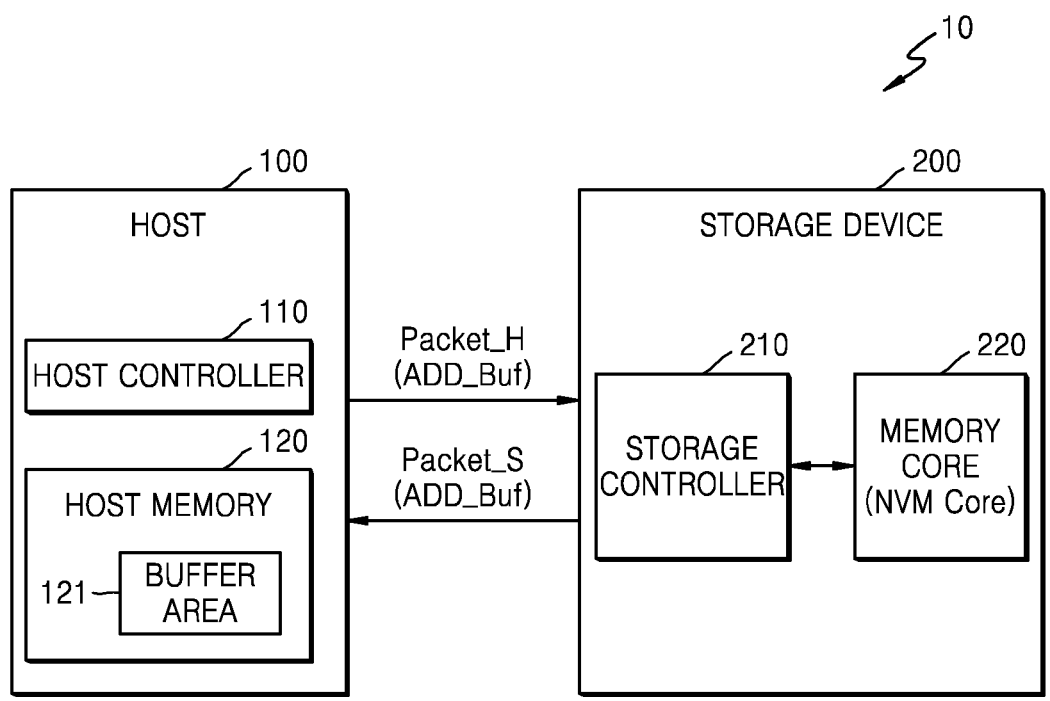
FIG. 1 is a block diagram of a data processing system according to an embodiment of the disclosure.

FIG. 1 is a block diagram of a data processing system according to an embodiment of the disclosure.

A data processing system 10 may include a host 100 and a storage device 200. The storage device 200 may include a storage controller 210 and a memory core 220. When the storage device 200 stores data in a non-volatile manner, the memory core 220 may include a non-volatile memory (NVM) core. The host 100 may include a host controller 110 and a host memory 120. The host memory 120 may include a buffer area 121.

The data processing system (or storage system) 10 may be implemented as a personal computer (PC), a data server, a network-attached storage (NAS), an internet of things (IoT), or a portable electronic device. The portable electronic device may be a laptop computer, a cellular phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, or a wearable device.

The storage device 200 may include storage media which store data according to a request from the host 100. For example, the storage device 200 may include at least one solid state drive (SSD). When the storage device 200 includes an SSD, the storage device 200 may include a plurality of flash memory chips (e.g., NAND memory chips) storing data in a non-volatile manner.

Alternatively, the storage device 200 may be a flash memory device including at least one flash memory chip. In some embodiments, the storage device 200 may be an embedded memory in the storage system 10. For example, the storage device 200 may be an embedded multi-media card (eMMC) or an embedded universal flash storage (UFS) memory device. In other embodiments, the storage device 200 may be an external memory attachable to or detachable from the storage system 10. For example, the storage device 200 may be a UFS memory card, a compact flash (CF) card, a secure digital (SD) card, a micro-SD card, a mini-SD card, an extreme digital (xD) card, or a memory stick.

When the storage device 200 includes flash memory, the flash memory may include a two-dimensional (2D) NAND memory array or a three-dimensional (3D) (or vertical NAND (VNAND)) memory array. A 3D memory array may be monolithically formed at at least one physical level of memory cell arrays, which have an active region disposed on a silicon substrate, or of a circuit, which is involved in the operation of memory cells and formed on or in the substrate. The term "monolithic" means that layers of each level of an array are directly deposited on layers of an underlying level of the array. In some embodiments of the disclosure, the 3D memory array includes vertical NAND strings which are arranged in a vertical direction so that at least one memory cell is placed on another memory cell. The at least one memory cell may include a charge trap layer.

Structures of a 3D memory array, in which the 3D memory array includes a plurality of levels and word lines and/or bit lines that are shared by levels, are disclosed in U.S. Pat. Nos. 7,679,133, 8,553,466, 8,654,587, 8,559,235, and U.S. Patent Application No. 2011/0233648, the disclosures of which are incorporated herein by references.

In another example, the storage device 200 may include different kinds of non-volatile memory. The storage device 200 may use magnetic random access memory (MRAM), spin-transfer torque MRAM, conductive bridging RAM (CBRAM), ferroelectric RAM (FeRAM), phase RAM (PRAM), resistive RAM, and other different kinds of memory.

The host 100 may communicate with the storage device 200 using various kinds of interfaces. For example, the host 100 may be connected with the storage device 200 using a standard interface such as universal flash storage (UFS), serial advanced technology attachment (SATA), small computer small interface (SCSI), serial attached SCSI (SAS), or eMMC. The host 100 and the storage device 200 may generate and transmit a packet according to a protocol of the currently used interface. FIG. 1 shows a first packet Packet_H generated in the host 100 and transmitted to the storage device 200 and a second packet Packet_S generated in the storage device 200 and transmitted to the host 100.

The host controller 110 may include a host controller interface (not shown). The host controller interface may manage an operation of storing data (e.g., write data) of the buffer area 121 in the memory core 220 or storing data (e.g., read data) of the memory core 220 in the buffer area 121. The storage controller 210 may include a device controller interface (not shown) for an interface with the host controller 110.

The host controller 110 and the host memory 120 may be implemented in separate semiconductor chips, respectively. Alternatively, the host controller 110 and the host memory 120 may be integrated into one semiconductor chip. The host controller 110 may be one of a plurality of modules included in an application processor. The application processor may be implemented as a system on chip (SoC). The host memory 120 may be an embedded memory placed inside the application processor or a memory device or module placed outside the application processor.

The host 100 may also include various devices involved in the driving of the storage device 200. For example, a software module (not shown) such as a host application or a device driver may be included in the host 100. The software module may be loaded to the host memory 120 and executed by a processor (not shown).

The buffer area 121 of the host memory 120 may include a plurality of data buffers. The data buffers may be accessed by a buffer address ADD_Buf. For example, write data may be stored in a data buffer and may be transmitted from the data buffer to the storage device 200 based on the control of the host controller 110. In addition, read data from the storage device 200 may be stored in a data buffer based on the control of the host controller 110.

The host controller 110 may include the buffer address ADD_Buf, which indicates a location of a data buffer selected from among a plurality of data buffers in response to a request, in the first packet Packet_H. For example, when the first packet Packet_H requesting a data write is generated, the host controller 110 may generate the first packet Packet_H containing the buffer address ADD_Buf indicating a location of a data buffer in which write data has been stored and may transmit the first packet Packet_H to the storage device 200. When the first packet Packet_H requesting a data read is generated, the host controller 110 may generate the first packet Packet_H containing the buffer address ADD_Buf indicating a location of a data buffer in which read data will be stored.

The storage controller 210 may store and manage the buffer address ADD_Buf and a command parsed from the first packet Packet_H. In addition, when generating the second packet Packet_S in response to the first packet Packet_H, the storage controller 210 may include the buffer address ADD_Buf, which has been stored and managed in the storage device 200, in the second packet Packet_S.

The host 100 may receive the second packet Packet_S, which contains the buffer address ADD_Buf, from the storage controller 210 and may access the buffer area 121 using the buffer address ADD_Buf parsed from the second packet Packet_S. In other words, the host 100 does not need to access other areas to check relevant information in order to determine a location of a data buffer but may access just a data buffer corresponding to the buffer address ADD_Buf parsed from the second packet Packet_S.

According to the embodiments described above, additional access operations of the host memory 120 are not necessary to determine a location of a data buffer, and therefore, a frequency at which the host controller 110 accesses the host memory 120 may be reduced. For example, conventionally, a buffer address is separately stored in one area within the host memory 120 and a separate access, i.e., an operation of reading the buffer address needs to be performed in order to determine a location of a data buffer in which write data has been stored or read data will be stored. However, according to the embodiments of the disclosure, the data buffer may be directly accessed without the separate access operation. As a result, overhead of a data processing operation is reduced, so that data processing performance is increased.

Figure 2:
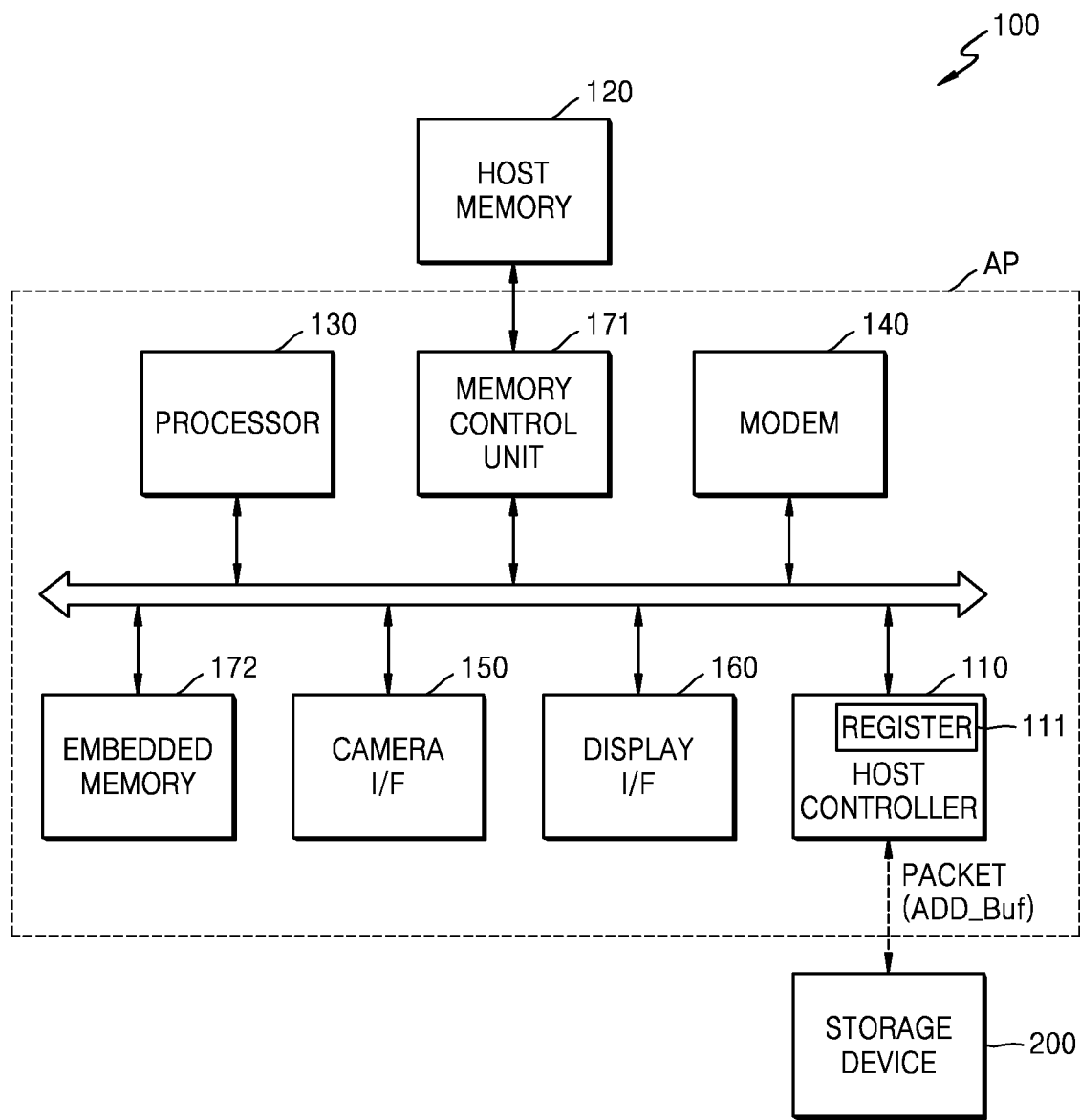
FIG. 2 is a block diagram of a host illustrated in FIG. 1, according to an embodiment of the disclosure.

FIG. 2 is a block diagram of the host 100 illustrated in FIG. 1, according to an embodiment of the disclosure. FIG. 2 shows an application processor (AP) including a host controller.

Referring to FIG. 2, the host 100 may include the AP and the host memory 120. The AP may include at least one module as an intellectual property (IP). For example, the AP may include the host controller 110, a processor 130, a modem 140, a camera interface (I/F) 150, a display I/F 160, a memory control unit 171, and an embedded memory 172.

Although it is illustrated in FIG. 2 that the host memory 120 is an external memory of the AP, the disclosure is not limited thereto. For example, the embedded memory 172 of the AP may be used as a host memory. The elements shown in FIG. 2 are just examples and the AP may also include other elements than those shown in FIG. 2 or some of the elements shown in FIG. 2 may not be included in the AP.

The processor 130 may control all operations of the AP. For example, software (e.g., an AP and a device driver) for managing a data write/read operation on a storage device 200 may be loaded to the host memory 120 or the embedded memory 172, and the processor 130 may manage the data write/read operation by executing the software. The host memory 120 may be implemented as volatile memory or non-volatile memory. In some embodiments, the host memory 120 may include volatile memory such as dynamic RAM (DRAM) and/or static RAM (SRAM).

The AP may perform a camera control operation, a display control operation, and a modem operation. As the modem 140 is included in the AP, the AP may be referred to as a ModAP.

The host controller 110 may transmit or receive a packet containing the buffer address ADD_Buf to or from the storage device 200, as described above. The host controller 110 may include a register 111 storing at least one transfer request. Transfer requests involved in a write operation and/or a read operation on the storage device 200 may be stored in the register 111 based on the control of the processor 130. Various kinds of information used to generate a packet corresponding to the transfer requests may be stored in the host memory 120 based on the control of the processor 130. For example, table information including information about the type of packet and the buffer address ADD_Buf may be stored in the host memory 120. In case of a data write request, write data may be stored in a plurality of data buffers in the host memory 120 based on the control of the processor 130. The host controller 110 may check transfer requests stored in the register 111 and may interface with the storage device 200 based on the transfer requests.

As described above, the host controller 110 may receive a packet containing the buffer address ADD_Buf from the storage device 200, may parse the buffer address ADD_Buf from the packet, and may determine a location of a data buffer according to the buffer address ADD_Buf. For example, the host controller 110 may have lower access priority to the host memory 120 than the other modules in the AP. In this case, latency taken for the host controller 110 to access the host memory 120 may be high. However, according to the embodiments of the disclosure, a frequency at which the host controller 110 accesses the host memory 120 may be reduced and an increase in overhead of data processing operations may be prevented.

Figure 3:
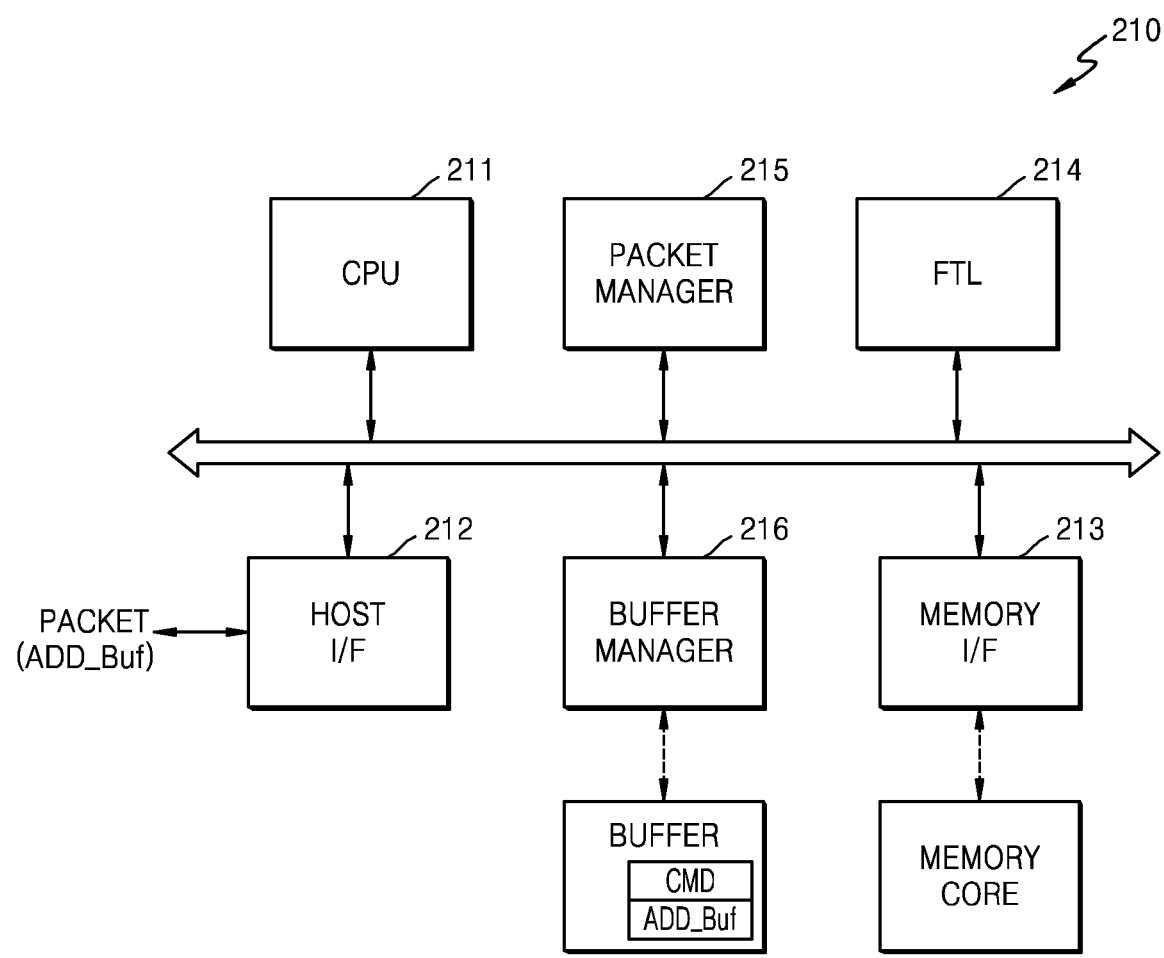
FIG. 3 is a block diagram of a storage controller illustrated in FIG. 1, according to an embodiment of the disclosure.

FIG. 3 is a block diagram of the storage controller 210 illustrated in FIG. 1, according to an embodiment of the disclosure.

Referring to FIGS. 1 and 3, the storage controller 210 may include a central processing unit (CPU) 211 as a processor, a host I/F 212, and a memory I/F 213. The storage controller 210 may also include a flash translation layer (FTL) 214, a packet manager 215, and a buffer manager 216. The storage controller 210 may also include a working memory (not shown) to which the FTL 214 is loaded and, as the CPU 211 executes the FTL 214, data write and read operations on a memory core 220 may be controlled.

The host I/F 212 may transmit or receive a packet to or from the host 100. As described above, the packet transmitted or received by the host I/F 212 may contain the buffer address ADD_Buf indicating a location of a data buffer in the buffer area 121 within the host 100. The memory I/F 213 may perform an operation of writing or reading data by interfacing with the memory core 220.

The packet manager 215 may generate a packet complying with the protocol of the interface between the packet manager 215 and the host 100 and may parse various kinds of information from the packet. The buffer manager 216 may manage an operation of storing the various kinds of information parsed from the packet in a buffer 230. For example, the buffer manager 216 may manage an operation of storing a command CMD and the buffer address ADD_Buf which have been parsed from the packet. The buffer manager 216 may also manage an operation of storing write data parsed from the packet in the buffer 230 and an operation of storing data read from the memory core 220 in the buffer 230. The buffer 230 may be included in the storage controller 210 or may be placed outside the storage controller 210. Although the buffer address ADD_Buf and the data are stored in one buffer in the embodiment illustrated in FIG. 3, the buffer address ADD_Buf and the data may be respectively stored in separate storage circuits.

As described above, when the storage device 200 generates a packet to be transmitted to the host 100, the storage device 200 may read the buffer address ADD_Buf from the buffer 230 and may include the buffer address ADD_Buf in the packet to be transmitted to the host 100.

For example, in a data write operation, a write command and a first buffer address corresponding thereto may be parsed from a packet received from the host 100 and the first buffer address may be stored in the buffer 230 of the storage device 200. The storage device 200 may generate a packet requesting to transfer write data in a predetermined unit of size in response to the write command. At this time, the first buffer address corresponding to the write command may be included in the packet and the host 100 may refer to the first buffer address contained in the packet and transmit the write data stored in a data buffer at a location indicated by the first buffer address to the storage device 200.

Similarly, in a data read operation, a read command and a second buffer address corresponding thereto may be parsed from a packet received from the host 100 and the second buffer address may be stored in the buffer 230 of the storage device 200. The storage device 200 may generate a packet including read data in response to the read command. The second buffer address corresponding to the read command may be included in the packet. The host 100 may refer to the second buffer address contained in the packet and store the read data in a data buffer at a location indicated by the second buffer address.

Figure 4:
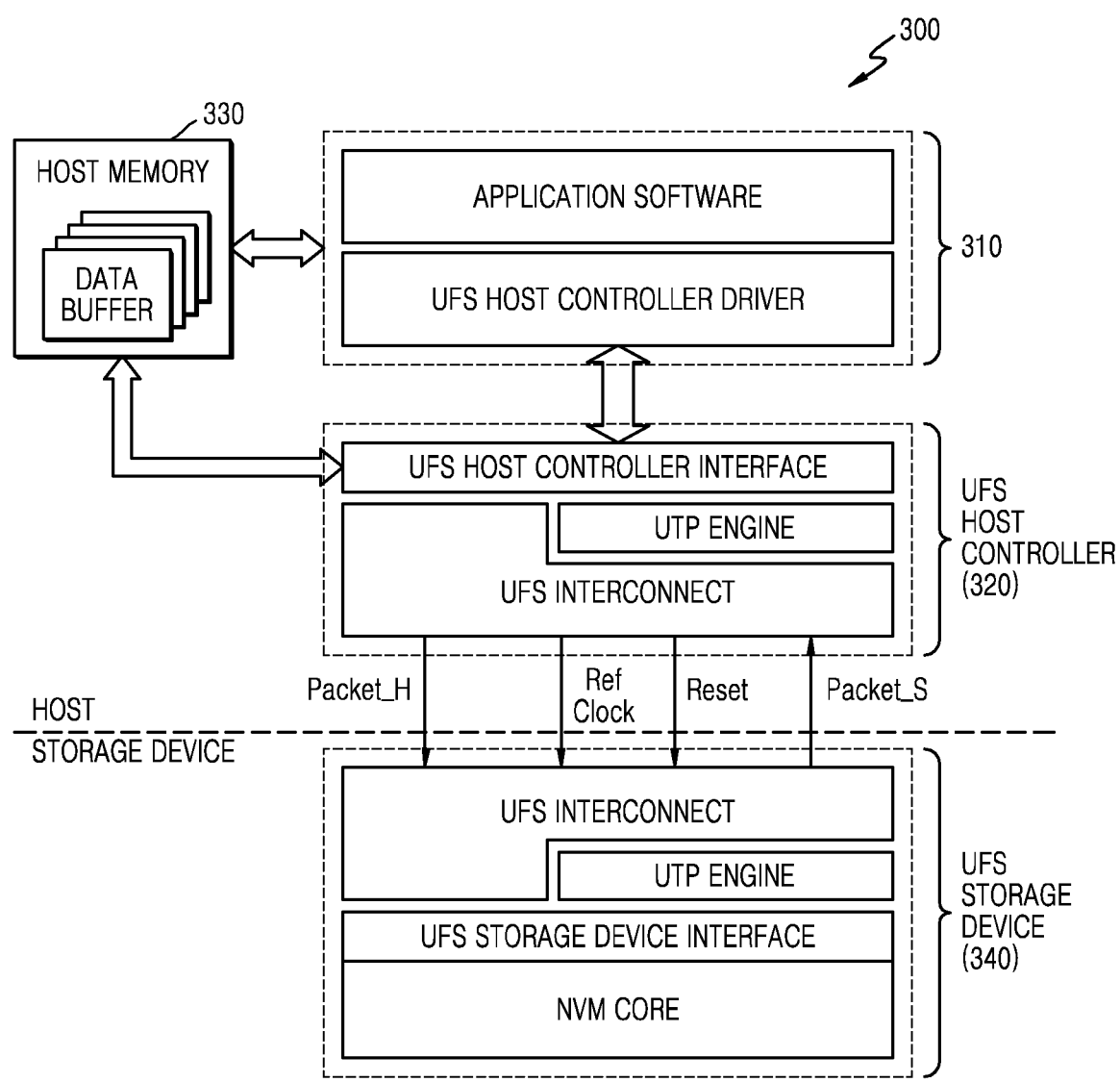
FIG. 4 is a block diagram of a storage system using a universal flash storage (UFS) interface, according to an embodiment of the disclosure.

FIG. 4 is a block diagram of a storage system using a UFS interface according to an embodiment of the disclosure.

Referring to FIG. 4, a UFS host and a UFS storage device may perform communication according to a UFS interface in a storage system 300. The UFS host may include a software module 310 and a hardware module which includes a UFS host controller 320 and a host memory 330. The software module 310 may include application software and a UFS host controller driver. The application software may be various application programs executed in the UFS host. The UFS host controller driver is used to manage the driving of peripheral devices connected to the UFS host. Data management operations such as data write and read operations on the storage device may be performed by executing the UFS host controller driver. The application software and the UFS host controller driver may be loaded to the host memory 330 shown in FIG. 4 or to another operating memory in the UFS host and may be executed by a processor.

The UFS host controller 320 may include a UFS host controller interface, a UFS transport protocol (UTP) engine, and a UFS interconnect layer. The UFS host controller interface may receive a request generated using the UFS host controller driver and transmit the request to the UTP engine. The UFS host controller interface may also transmit a data access result from the UTP engine to the UFS host controller driver. The UTP engine may provide services for an upper layer (or application layer). The UTP engine may generate a packet or release a packet and parse information therein.

The UFS interconnect layer may communicate with a UFS storage device 340. The UFS interconnect layer may include a link layer and a physical (PHY) layer. The link layer may be mobile industry processor interface (MIPI) UniPro and the PHY layer may be MIPI M-PHY. The UFS host may provide a reference clock Ref Clock and a reset signal Reset for the UFS storage device 340 according to the UFS interface.

The UFS storage device 340 may include a storage controller and a memory core. In the embodiment illustrated in FIG. 4, the storage controller may include a UFS interconnect layer, a UTP engine, and a UFS storage device interface. The memory core may be a core including non-volatile memory, i.e., an NVM core.

In the structure in which the UFS host controller 320 communicates with the UFS storage device 340, transmitting or receiving data according to a request from the UFS host controller driver may be performed through the UFS host controller interface. For example, in a data write operation, the software module 310 may store write data in a data buffer of the host memory 330, the UFS host controller interface may access the data buffer of the host memory 330, and the accessed write data may be transmitted to the UFS storage device 340.

According to an embodiment of the disclosure, a buffer address indicating a location of a data buffer in the host memory 330 may be included in the first packet Packet_H transmitted from the UFS host to the UFS storage device 340 and/or the second packet Packet_S transmitted from the UFS storage device 340 to the UFS host. The buffer address may correspond to a physical address indicating the location of the data buffer. Table information (e.g., a physical region description table (PRDT)) including buffer addresses may be stored in a certain area in the host memory 330. The UTP engine of the UFS host may determine a buffer address based on the PRDT and generate the first packet Packet_H containing the buffer address. The UTP engine of the UFS storage device 340 may generate the second packet Packet_S containing a buffer address which has been stored and managed in the UFS storage device 340.

The UFS host controller 320 may be connected with the UFS storage device 340 by way of port-mapped input/output (I/O). Write and read operations may be processed in multi-task mode. Accordingly, the UFS storage device 340 may store and manage a plurality of commands parsed from a plurality of packets and buffer addresses corresponding to the commands.

As the UFS interface is used, various types of packets may be defined and embodiments of the disclosure may be applied to at least some of these packets. For example, a packet complying with the UFS interface may be defined as a UFS protocol information unit (UPIU). Various types of packets may include a command UPIU for requesting to write or read, a response UPIU, a data_in UPIU including read data, a data_out UPIU including write data, a task management (TM) request UPIU, and a ready-to-transfer (RTT) UPIU. According to embodiments of the disclosure, the above-described buffer address may be included in at least some types of packets among the various types of packets defined in the UFS interface. For example, the buffer address may be included in a packet request to access a data buffer of the host memory 330.

Hereinafter, the operations of an interface between a host and a storage device according to some embodiments of the disclosure will be described in detail. Although the host and the storage device use the UFS interface in these embodiments, the embodiments may also be applied to other kinds of interfaces than the UFS interface.

Figure 5:
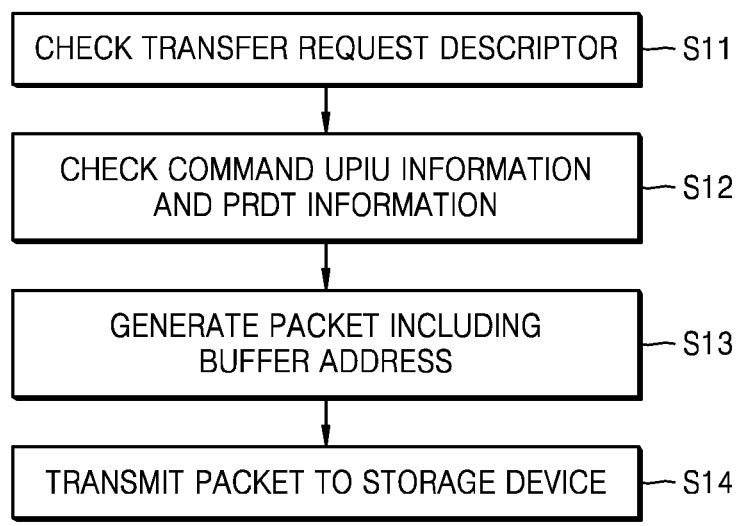
FIGS. 5 and 6 are flowcharts of a method of operating a host, according to an embodiment of the disclosure.
Figure 6:
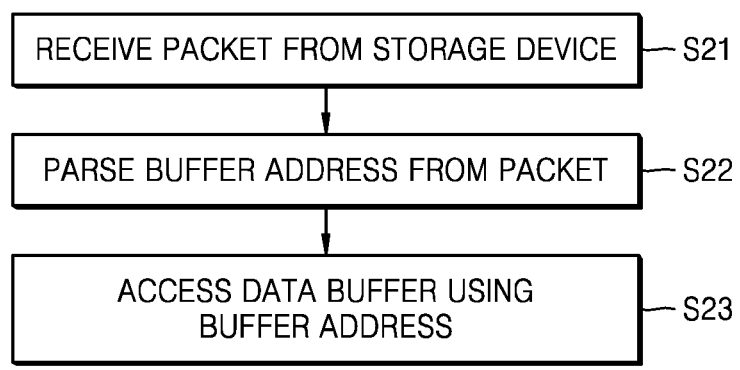

FIGS. 5 and 6 are flowcharts of a method of operating a host according to an embodiment of the disclosure. FIG. 5 shows an example where the host transmits a packet. FIG. 6 shows an example where the host receives a packet.

Referring to FIG. 5, the host may include a host controller and various kinds of information generated using a software module in the host may be stored in a host memory. For example, at least one transfer request may be stored in a register within the host controller and a transfer request descriptor corresponding to the transfer request may be stored in a certain region (e.g., a descriptor region) within the host memory. The transfer request descriptor may be used to generate a response UPIU and a command UPIU to be used together with PRDT information. Packet-related information such as a command UPIU or a response UPIU and PRDT information may be stored in another area within the host memory. The PRDT information may include a buffer address indicating a location of a data buffer in which write data has been stored or read data will be stored. The packet-related information stored in the host memory will be referred to as command UPIU information or response UPIU information.

When a host controller interface operation is started for data transmission/reception, the host controller may check a transfer request descriptor, which corresponds to the transfer request stored in the register, in the host memory in operation S11. The host controller may check command UPIU information for a data write request and PRDT information using the transfer request descriptor in operation S12. The host controller may generate a packet containing a buffer address (e.g., a physical address), which indicates a location of a data buffer in which write data has been stored, using the PRDT information in operation S13 and may transmit the packet to a storage device in operation S14.

Referring to FIG. 6, the host may receive a packet from a storage device in operation S21. The packet may be provided for the host controller within the host. The host controller may parse various kinds of information from the packet. As described above, the storage device may store and manage a command and a buffer address corresponding to the command, which have been transmitted from the host, and the buffer address may be included in at least some of various types of packets transmitted from the storage device.

The host controller may parse a buffer address from the packet in operation S22. The host controller may also access a data buffer within the host memory using the buffer address in operation S23. When the packet corresponds to an RTT UPIU requesting to transfer write data, the host controller may transmit write data stored in the data buffer at a location corresponding to the buffer address to the storage device, without separately checking PRDT information stored in the host memory. When the packet corresponds to a data_in UPIU including read data, the host controller may store the read data included in the packet in the data buffer at the location corresponding to the buffer address, without separately checking the PRDT information stored in the host memory.

Figure 7:
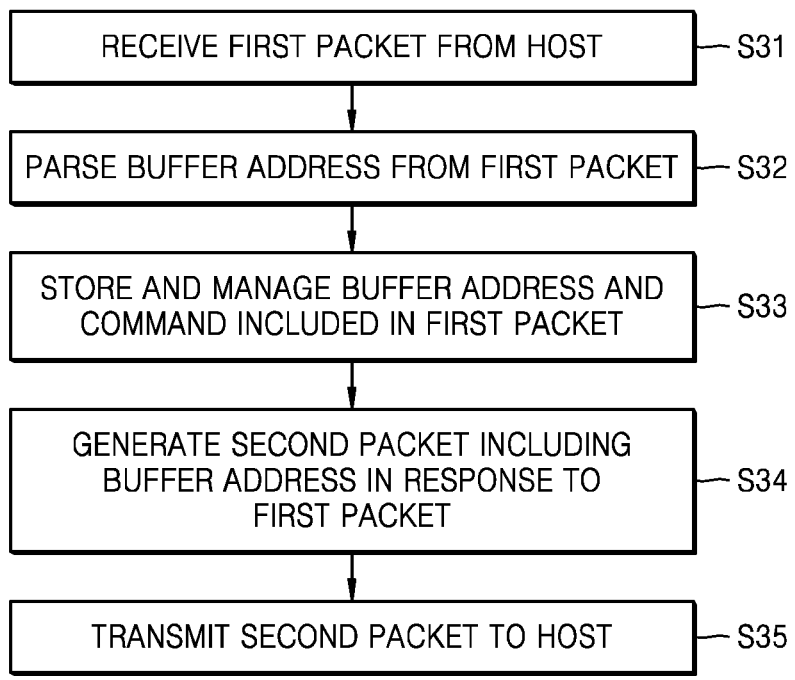
FIG. 7 is a flowchart of a method of operating a storage device, according to an embodiment of the disclosure.

FIG. 7 is a flowchart of a method of operating a storage device according to an embodiment of the disclosure.

The storage device may receive a first packet from a host in operation S31. The first packet may correspond to a command UPIU. The command UPIU may include a command for a data access such as a data write or a data read. As described above, the first packet may contain a buffer address indicating a location of a data buffer in which write data has been stored or read data will be stored. The storage device may parse the buffer address from the first packet in operation S32 and may store and manage the command contained in the first packet and the buffer address in an internal storage circuit (e.g., a command queue and an address queue) in operation S33.

The storage device may generate a second packet in response to the first packet and transmit the second packet to the host. The buffer address parsed from the first packet may be included in the second packet generated in response to the first packet in operation S34. For example, during a data write operation, the storage device may generate, as the second packet, an RTT UPIU indicating that it is ready to receive write data and the buffer address may be included in the RTT UPIU. During a data read operation, the storage device may generate, as the second packet, a data_in UPIU including read data and the buffer address may be included in the data_in UPIU. The storage device may transmit the second packet containing the buffer address to the host in operation S35.

Figure 8:
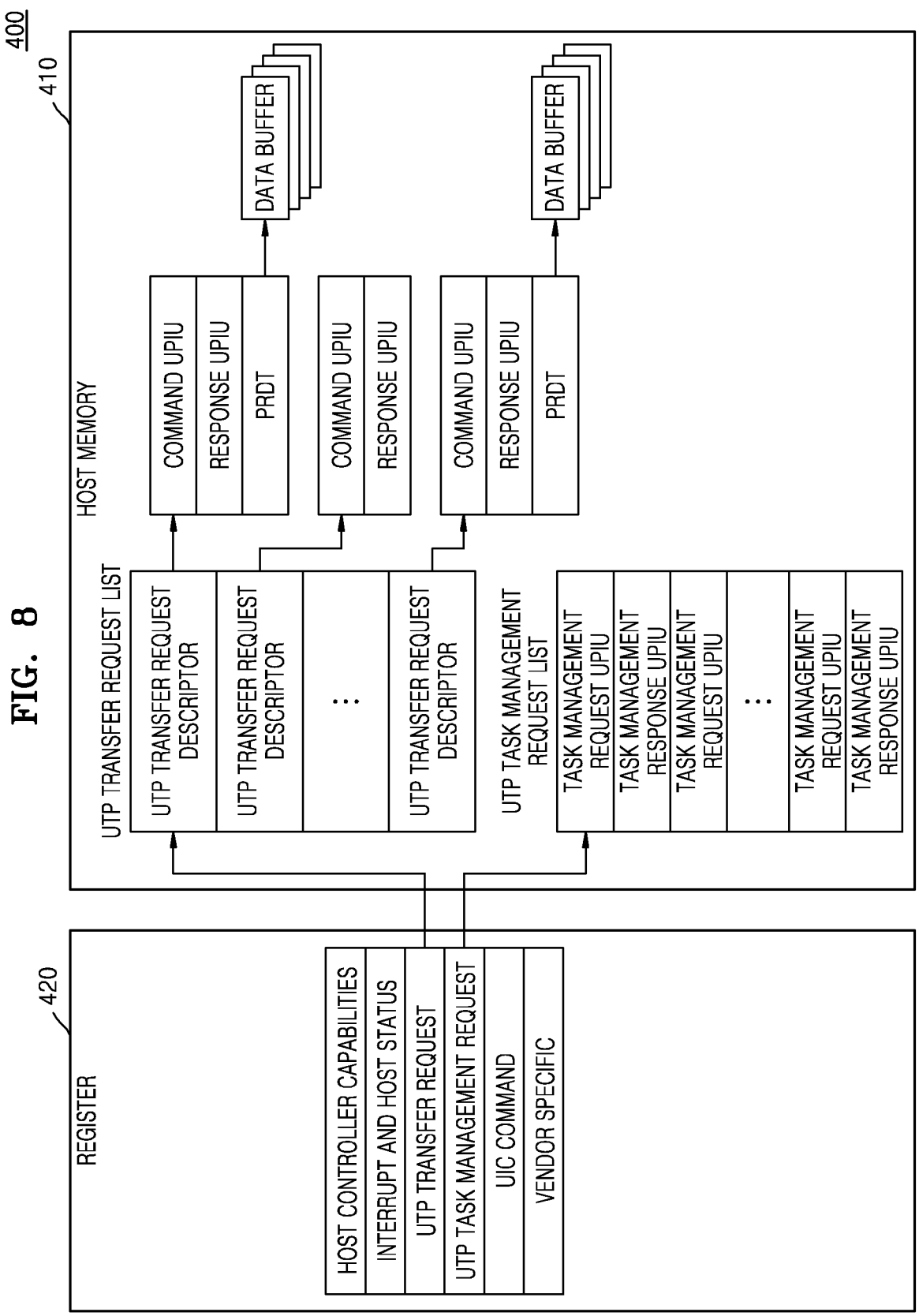
FIG. 8 and FIGS. 9A and 9B are block diagrams of various kinds of information stored in a host memory and a register included in a host controller, according to an embodiment of the disclosure.
Figure 9A:
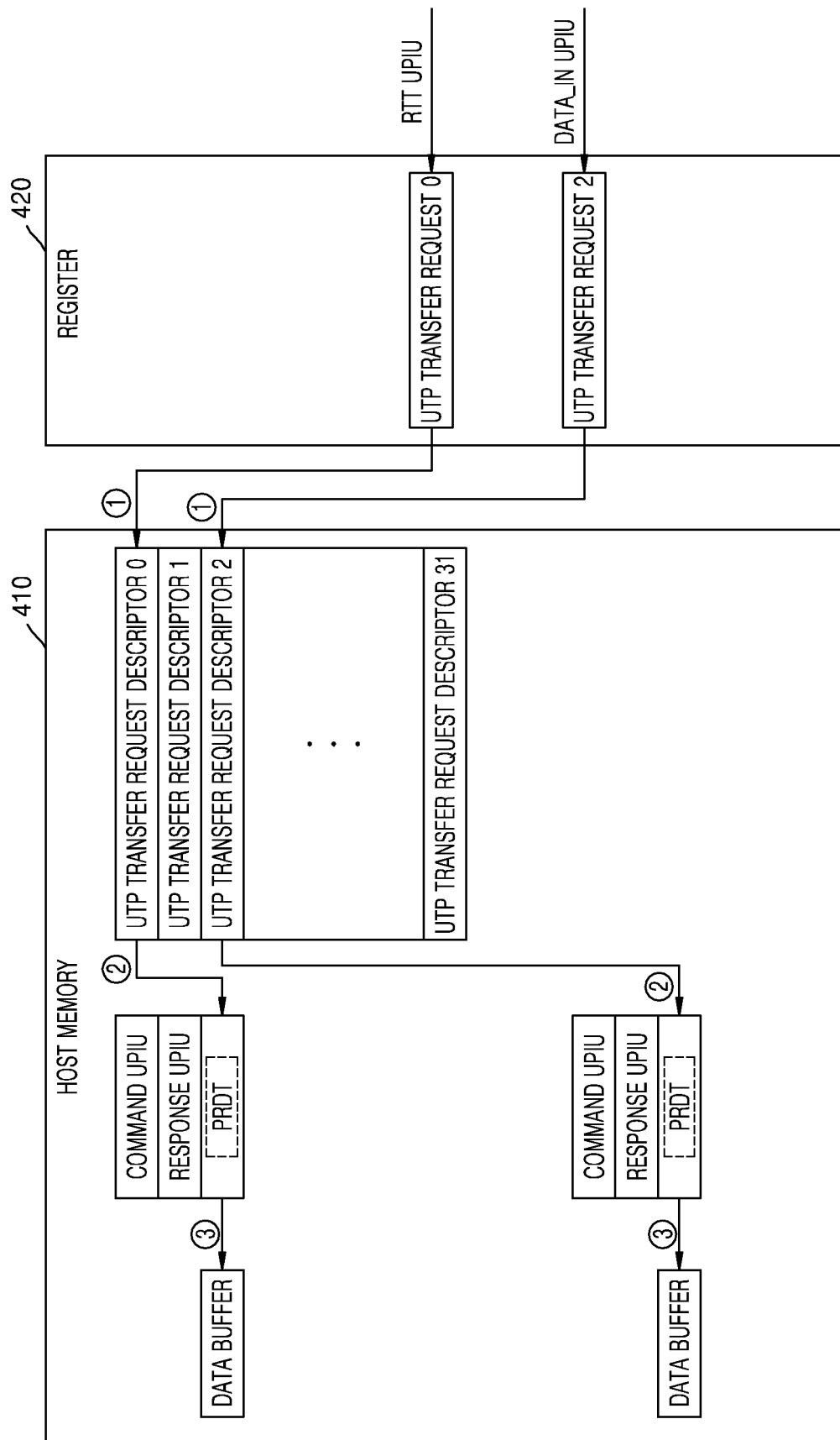
Figure 9B:
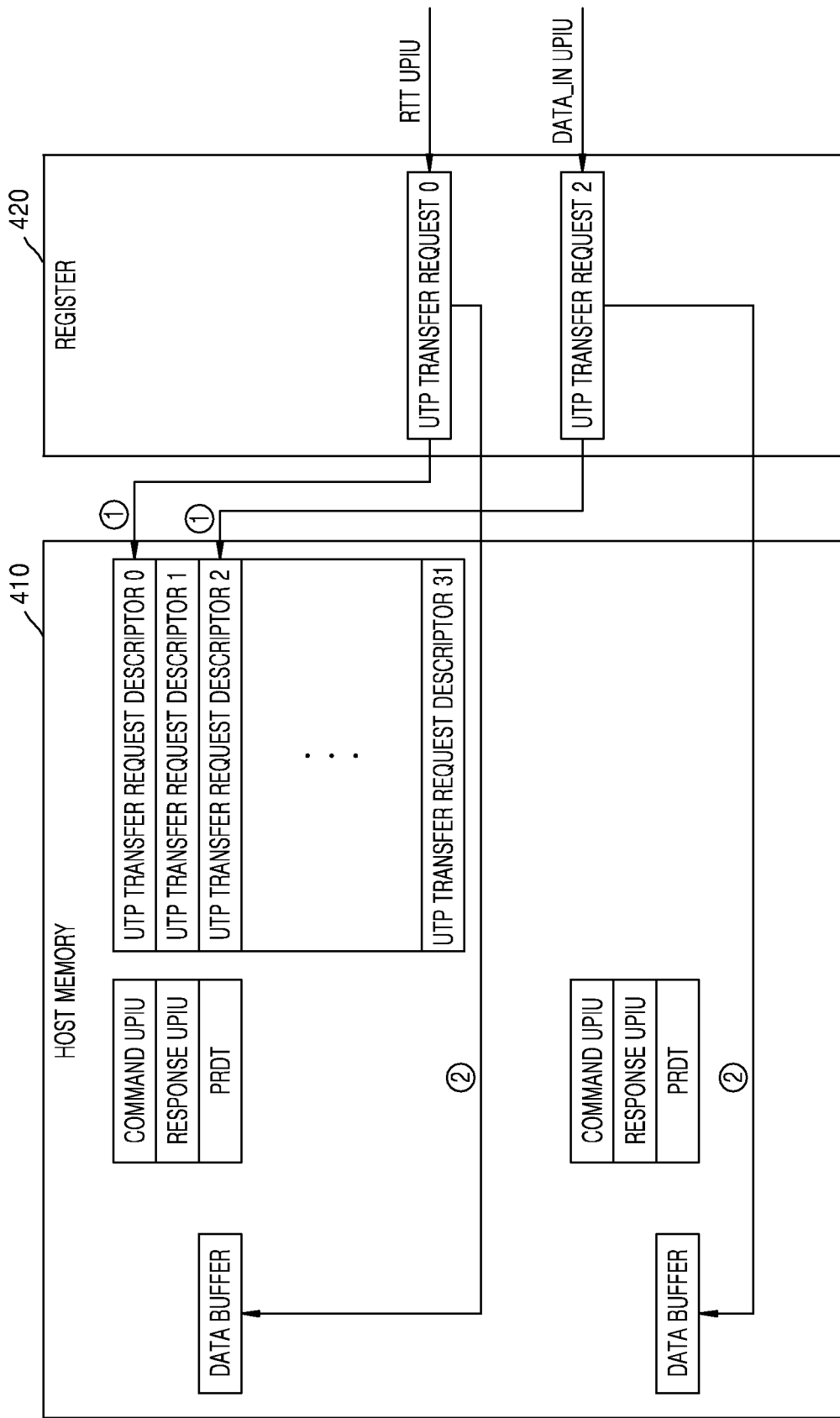

FIG. 8 and FIGS. 9A and 9B are block diagrams of various kinds of information stored in a host memory and a register included in a host controller, according to an embodiment of the disclosure.

Referring to FIG. 8, a host 400 may include a host memory 410 and a register 420. The register 420 may be provided inside a host controller and the host memory 410 may be disposed outside the host controller. Various kinds of commands and parameters defined in Joint Electron Device Engineering Council (JEDEC) UFS standards may be stored in the host memory 410 and the register 420 to manage data with respect to a storage device. A UTP transfer request descriptor may be stored in a descriptor region of the host memory 410 and UPIU information and corresponding PRDT information may be stored in another region of the host memory 410. UTP transfer request descriptors may be stored or checked in the host memory 410 based on a UTP transfer request stored in the register 420.

Write data and read data may be stored in a plurality of data buffers included in a buffer area of the host memory 410. PRDT information may contain a buffer address as a physical address of a data buffer. PRDT information may not be stored with respect to some command UPIUs. For example, PRDT information may not be stored with respect to a command UPIU irrelevant to an access to a data buffer.

Other various kinds of information defined in the JEDEC UFS standards are illustrated in FIG. 8. For example, a UTP task management request list may also be stored in one region of the host memory 410. For instance, a task management request UPIU and a task management response UPIU may be stored in one region of the host memory 410. The task management request list may be stored in the host memory 410 based on a UTP task management request stored in the register 420. Besides, other components defined in the JEDEC UFS standards are illustrated in FIG. 8. For example, host controller capabilities, interrupt and host status, UFS interconnect (UIC) command, and vendor specific may be stored in the register 420.

The embodiments of the present disclosure are not limited to the configuration shown in FIG. 8. In an embodiment, at least some of the information stored in the host memory 410 in FIG. 8 may be stored in the register 420. In an embodiment, at least one of the UTP transfer request descriptor, the UPIU information, the PRDT information, and the UTP task management request list may be stored in the register 420. Further, in another embodiment, the host memory 410 may include only data buffers, and the remaining information may be stored in the register 420.

FIGS. 9A and 9B are block diagrams of the comparison of the access frequency to a host memory between a typical case and an embodiment of the disclosure. FIGS. 9A and 9B show examples in which a host operates according to a packet received from a storage device.

FIG. 9A shows an example in which a packet complying with a typical format is processed. Referring to FIG. 9A, at least one UTP transfer request may be stored in the register 420 within a host controller. For example, a first transfer request "TRANSFER REQUEST 0" may correspond to a data write request and a third transfer request "TRANSFER REQUEST 2" may correspond to a data read request. The host controller may receive an RTT UPIU from the storage device in response to the first transfer request "TRANSFER REQUEST 0". The host controller may also receive a data_in UPIU from the storage device in response to the third transfer request "TRANSFER REQUEST 2".

A header region storing header information may be included in a packet transmitted from the storage device. Header information of the RTT UPIU may include information about the size and offset of data to be transferred for a data write operation. The host controller may perform a processing operation using at least some information values in the header information of the RTT UPIU. For example, the host controller refers to logical unit number (LUN) and tag (i.e., identifier) information within the header information of the RTT UPIU and accesses the host memory 410 to check a corresponding UTP transfer request descriptor. The host controller also accesses a location detected from the UTP transfer request descriptor in the host memory 410 to check PRDT information. The host controller may also access a data buffer based on the PRDT information (e.g., a buffer address) and transmit data stored in the data buffer to the storage device.

When the data_in UPIU is received, the host controller may access the host memory 410 to check a UTP transfer request descriptor corresponding to the header information of the data_in UPIU ①. The host controller may also access the host memory 410 to check corresponding PRDT information ②. Read data included in the data_in UPIU may be stored in a data buffer corresponding to the PRDT information ③.

According to the above-described method, the host memory 410 is relatively frequently accessed for a data processing operation. For instance, the host controller accesses the host memory 410 twice to check a transfer request descriptor and PRDT information and once to read write data to process an RTT UPIU. A total of three accesses to the host memory 410 are required. At this time, since the host controller has lower access priority to the host memory 410 than other elements (e.g., a display I/F, a camera I/F, and a modem) of the host, overhead of data processing is increased.

According to an embodiment of the disclosure, as shown in FIG. 9B, a host may transmit the first transfer request "TRANSFER REQUEST 0" to a storage device and receive an RTT UPIU responding to the first transfer request "TRANSFER REQUEST 0" ①. The host may parse a buffer address from the RTT UPIU and may transmit data stored in a data buffer indicated by the buffer address to the storage device ②. In other words, an access to the host memory 410 performed by a host controller to check PRDT information upon receiving the RTT UPIU may be eliminated.

Similarly, when the host receives a data_in UPIU, the host controller does not need to perform an access operation to check PRDT information in the host memory 410 in order to determine a location of a data buffer in which read data will be stored. For example, the host controller may determine the kind of a request by checking a UTP transfer request descriptor based on the header information of the data_in UPIU ① and may store read data in a data buffer indicated by a buffer address parsed from the data_in UPIU ②.

According to the embodiment described above, the access frequency to the host memory 410 is decreased, and therefore, data throughput is increased. For example, in a data write operation, a plurality of RTT UPIUs may be sequentially transmitted to the host in response to a single command UPIU according to a data write unit in the storage device. At this time, data processing may be performed, without accessing the host memory 410 to separately check PRDT information in response to each RTT UPIU.

Figure 10:
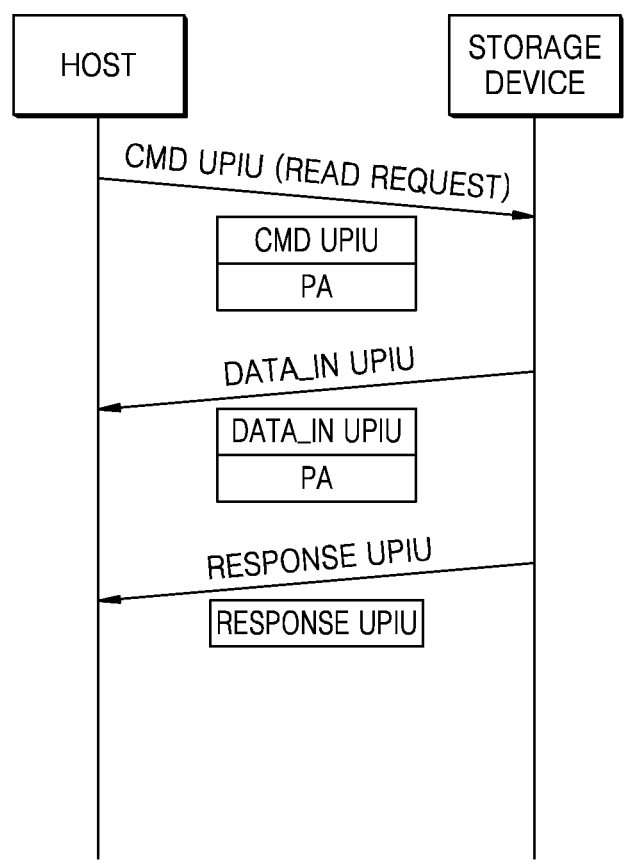

FIG. 10 and FIGS. 11A and 11B are diagrams of a data read operation and packets involved in a UFS interface, according to an embodiment of the disclosure.

Referring to FIG. 10, a command (CMD) UPIU for a data read request may be transmitted from a host to a storage device. A buffer address (or a physical address (PA) of a data buffer) may be included in the CMD UPIU for the data read request. The storage device may read data from a memory core in response to the CMD UPIU for the data read request and may transmit a data_in UPIU to the host. At this time, the data_in UPIU includes the PA parsed from the CMD UPIU and the read data. In addition, the storage device may transmit a response UPIU, which indicates completion of an operation corresponding to the CMD UPIU, to the host. As described above, the host may store the read data in a data buffer at a location indicated by the PA parsed from the data_in UPIU.

A packet structure of the CMD UPIU may be implemented as shown in FIG. 11A and a packet structure of the data_in UPIU may be implemented as shown in FIG. 11B. FIGS. 11A and 11B show examples in which a buffer address is included in an existing header region. FIG. 11A shows the structure of the CMD UPIU and FIG. 11B shows the structure of the data_in UPIU.

Referring to FIG. 11A, a header region H of the CMD UPIU may include a reserved region and a buffer address and relevant information may be included in part of the reserved region. For example, a host memory buffer address may be included in the reserved region. Information CWA indicating that the buffer address is included in the CMD UPIU and information CWA_LENGTH indicating the size of a region in which the buffer address is stored (or the size of a region in which the buffer address and the relevant information are stored) may also be included in the reserved region.

Referring to FIG. 11B, the data_in UPIU may include the header region H and a payload region DATA including data. The header region H may include a reserved region. A host memory buffer address and relevant information may be included in at least part of the reserved region. Information included in the reserved region illustrated in FIG. 11B is the same as or similar to that illustrated in FIG. 11A. Thus, detailed descriptions thereof will be omitted.

Figure 12:
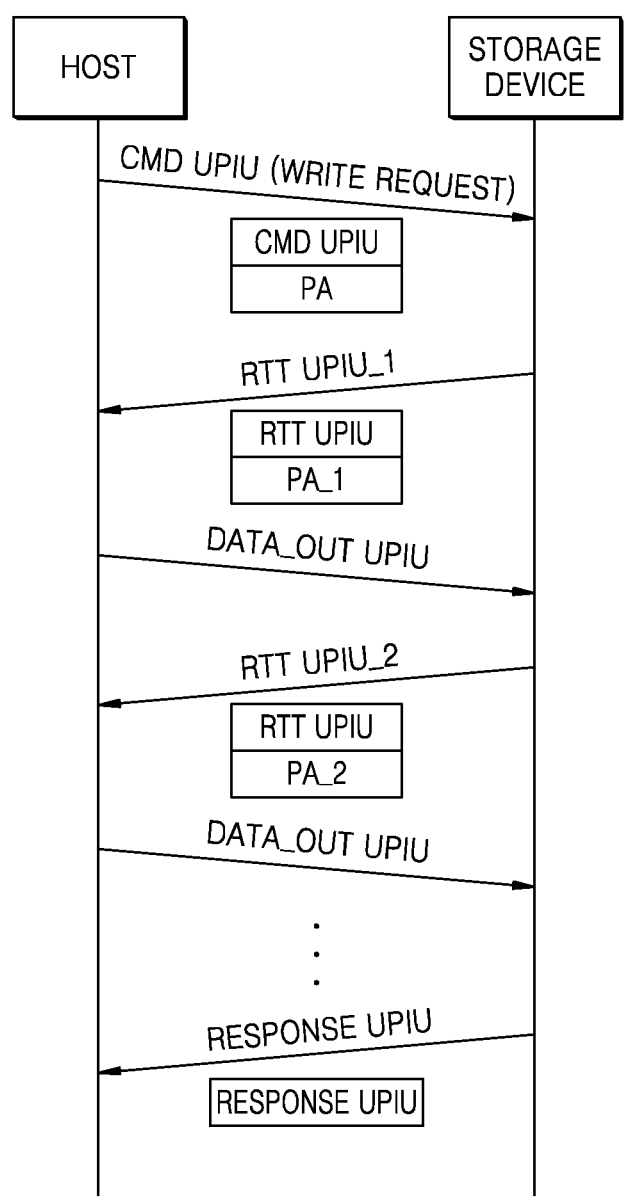

FIGS. 12 and 13 are diagrams of a data write operation and packets involved in the UFS interface, according to an embodiment of the disclosure.

Referring to FIG. 12, a CMD UPIU for a data write request may be transmitted from a host to a storage device. A PA indicating a location of a data buffer in which write data has been stored in the host may be included in the CMD UPIU. The storage device may transmit at least one RTT UPIU, which indicates that it is ready to receive the write data, to the host in response to the CMD UPIU for the data write request. According to the size of the write data and a data write unit of the storage device, a plurality of RTT UPIUs may be transmitted to the host.

For example, a first RTT UPIU, i.e., RTT UPIU_1, may be transmitted from the storage device to the host. A first PA PA_1 indicating a location of a data buffer in which write unit data to be transferred first has been stored may be included in the RTT UPIU_1. The host may determine the location of the data buffer therewithin using the first PA PA_1 parsed from the RTT UPIU_1 and may transmit data stored in the data buffer to the storage device as write data. The host may transmit a data_out UPIU including the write data to the storage device.

In addition, the storage device may transmit a second RTT UPIU, i.e., RTT UPIU_2, to the host. A second PA PA_2 indicating a location of a data buffer in which write unit data to be transferred second has been stored may be included in the RTT UPIU_2. The host may parse the second PA PA_2 from the RTT UPIU_2 and may transmit data, which has been stored in a data buffer at the location indicated by the second PA PA_2, to the storage device. As such operation is repeated, all of the data requested to be written may be transmitted to the storage device. When the data writing is completed, the storage device may transmit a response UPIU, which indicates completion of an operation corresponding to the CMD UPIU, to the host.

FIG. 13 shows an example of the packet structure of the above-described RTT UPIU. In this example, a buffer address is included in an existing header region. FIG. 13 shows the RTT UPIU_1 among the plurality of RTT UPIUs transmitted in response to a single CMD UPIU. The structure of the other RTT UPIUs may be the same as or similar to that shown in FIG. 13.

Referring to FIG. 13, the header region H of the RTT UPIU_1 may include a reserved region. A buffer address indicating a location of a data buffer in which write unit data has been stored may be included in at least part of the reserved region. The information CWA indicating that the buffer address is included and the information CWA_LENGTH indicating the size of a region, in which the buffer address is stored, may also be included in the reserved region. After the transmission of the RTT UPIU_1 is completed, the next RTT UPIU, e.g., the RTT UPIU_2, may be transmitted to the host. At this time, a value of the buffer address indicating a location of a data buffer in which write data has been stored may be changed.

Figure 14:
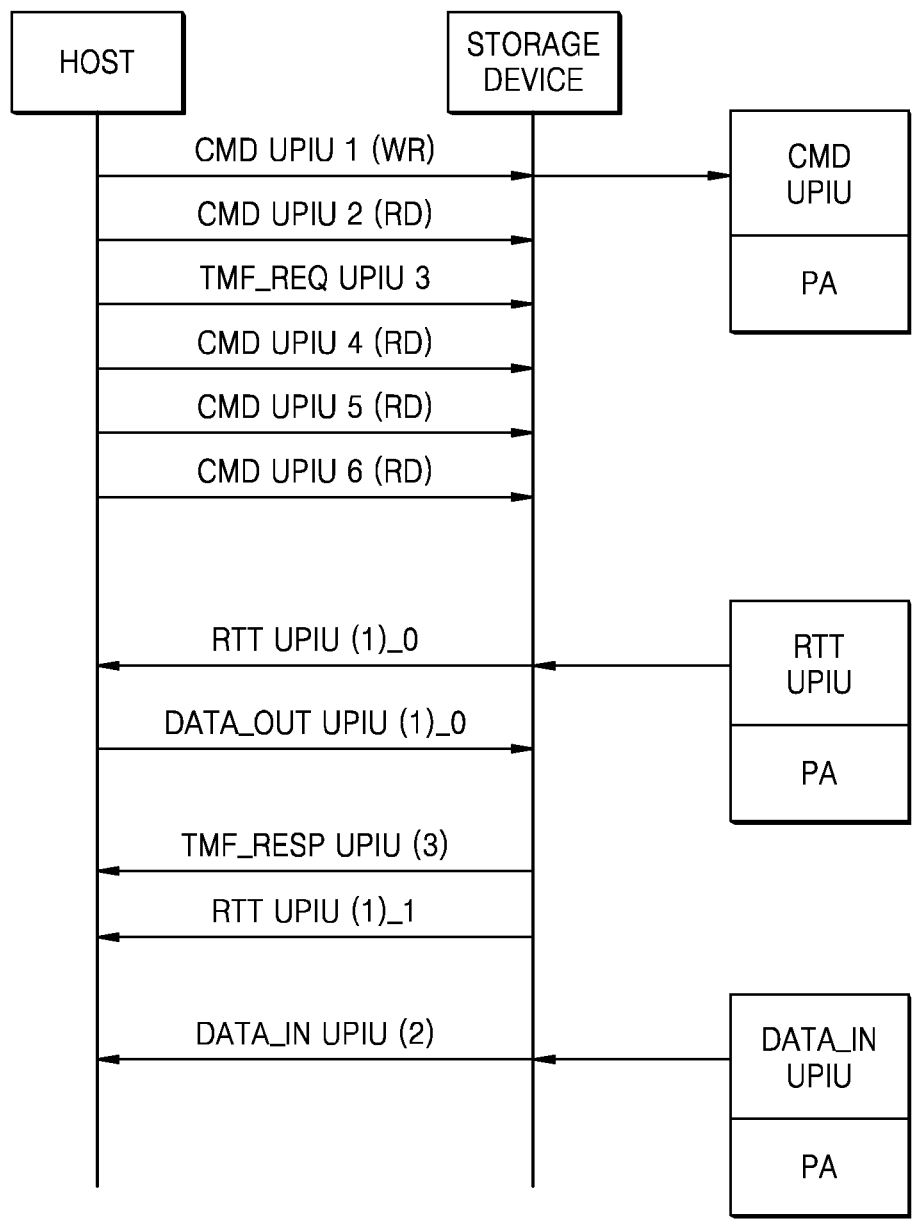
FIG. 14 is a diagram of an example in which an embodiment of the disclosure is applied to various types of packets defined in the UFS interface.

FIG. 14 is a diagram of an example in which an embodiment of the disclosure is applied to various types of packets defined in the UFS interface.

A host may sequentially transmit a plurality of UPIUs to a storage device. In the example shown in FIG. 14, a CMD UPIU for a write request, i.e., CMD UPIU 1, CMD UPIUs for a read request, i.e., CMD UPIU 2, CMD UPIU 4, CMD UPIU 5, and CMD UPIU 6, and a UPIU for a task management request, i.e., TMF_REQ UPIU 3 are transferred. As described above, in the UFS interface, an access to a data buffer in the host is required during data write and read operations on the storage device. Accordingly, a buffer address, i.e., a PA, may be included in each of the CMD UPIUs, i.e., CMD UPIU 1, CMD UPIU 2, CMD UPIU 4, CMD UPIU 5, and CMD UPIU 6. The storage device may parse the buffer address, i.e., the PA, from each of the CMD UPIUs, i.e., CMD UPIU 1, CMD UPIU 2, CMD UPIU 4, CMD UPIU 5, and CMD UPIU 6, and may store and manage the PA.

The storage device may also generate a UPIU in response to a request received from the host and transmit the UPIU to the host. One or more RTT UPIUs, i.e., RTT UPIU(1)_0 and RTT UPIU(1)_1, and a data_in UPIU, i.e., DATA_IN UPIU (2), including read data are shown in FIG. 14. Since an access to a data buffer is required in the host during an operation responding to an RTT UPIU or a data_in UPIU, a PA may be included in each of the RTT UPIU and the data_in UPIU.

The host may transmit a UPIU including write data, i.e. DATA_OUT UPIU(1)_0, to the storage device in response to the RTT UPIU. The host may also transmit a task management request UPIU, i.e., TMF_REQ UPIU 3, to the storage device. The storage device may perform a management operation on commands stored therein in response to the TMF_REQ UPIU 3. The storage device may also transmit a task management response UPIU, i.e., TMF_RESP UPIU(3), indicating the completion of the command management operation to the host in response to the TMF_REQ UPIU 3.

As described above, a data_out UPIU and a TMF_REQ UPIU from the host and a TMF_RESP UPIU from the storage device are irrelevant to an operation of accessing a data buffer within the host. Such a buffer address as described above may not be included in these UPIUs. Accordingly, as for various types of packets transferred through the UFS interface, the size of some types of packets excluding a payload may be different from the size of other types of packets excluding a payload.

Figure 15:
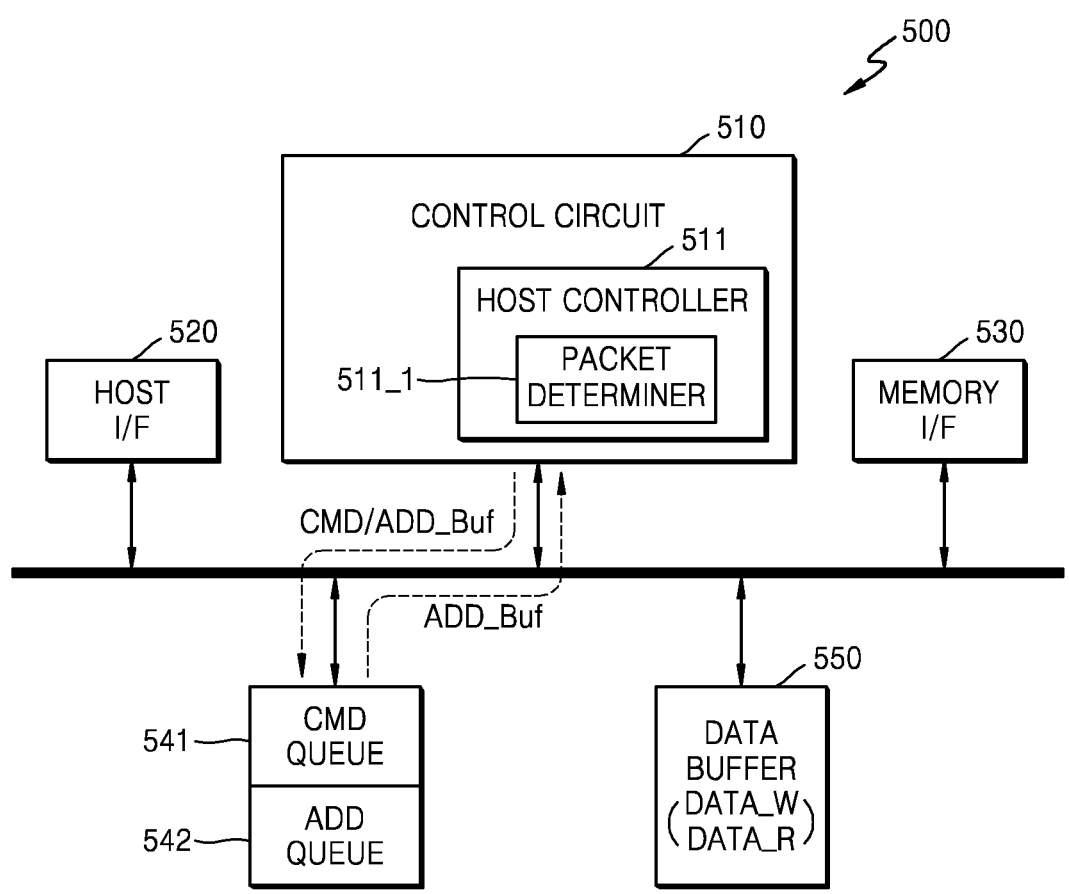
FIG. 15 is a block diagram of a storage controller managing a buffer address, according to an embodiment of the disclosure.

FIG. 15 is a block diagram of a storage controller managing a buffer address according to an embodiment of the disclosure.

Referring to FIG. 15, the storage controller 500 may include a control circuit 510, a host I/F 520, a memory I/F 530, a CMD queue 541, an address (ADD) queue 542, and a data buffer 550. In describing the operations of the storage controller 500 shown in FIG. 15, descriptions of the operations the same as or similar to those described with reference to FIG. 3 will be omitted. The data buffer 550 may temporarily store write data DATA_W and read data DATA_R.

The control circuit 510 may include various elements for controlling data write and read operations on a memory core according to a UFS interface protocol. The control circuit 510 may include a host controller 511. The host controller 511 may include a packet determiner 511_1. The host controller 511 may also include a UTP engine (not shown) for UTP process. The host controller 511 may generate a packet or parse various kinds of information from a received packet, as described above.

A parsed command and buffer address CMD/ADD_Buf may be stored and managed in the CMD queue 541 and the ADD queue 542 based on the control of the control circuit 510. A buffer address ADD_Buf may be read from the ADD queue 542 and provided to the host controller 511 and a packet containing the buffer address ADD_Buf may be generated. The packet determiner 511_1 may determine whether a packet to be transmitted to a host is of a type requiring an access to a data buffer of a host memory. According to the determination result, the ADD queue 542 may be selectively accessed FIG. 16 is a flowchart of a method of operating the storage controller 500 illustrated in FIG. 15, according to an embodiment of the disclosure.

Figure 16:
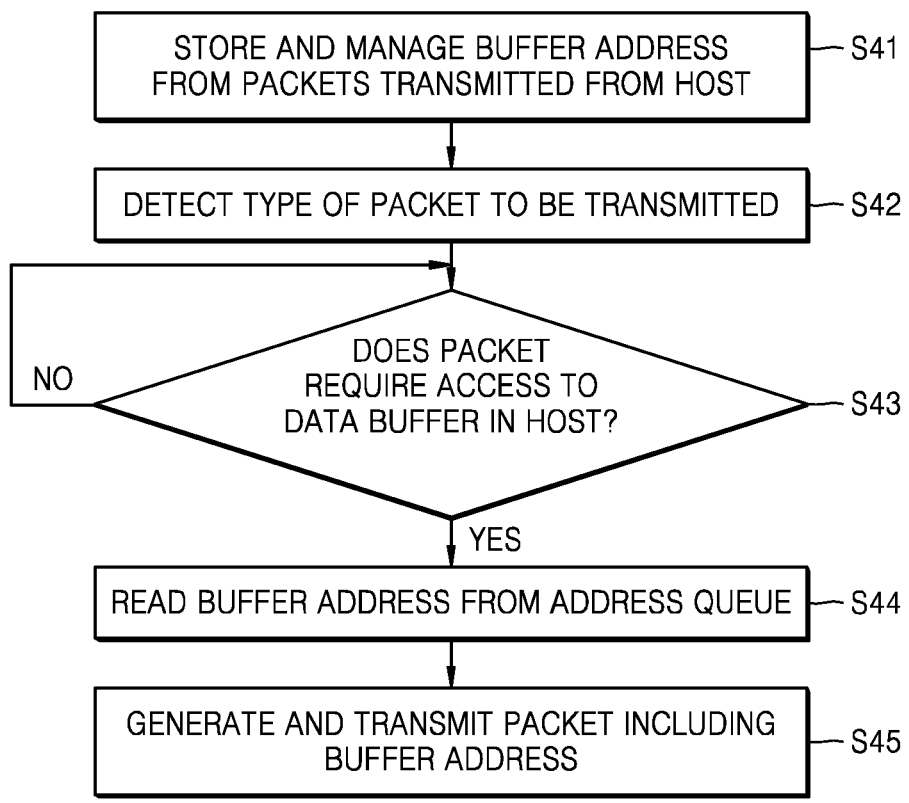
FIG. 16 is a flowchart of a method of operating the storage controller illustrated in FIG. 15, according to an embodiment of the disclosure.

Referring to FIG. 16, as described above, a storage device parses a buffer address from packets transmitted from a host and stores and manages the buffer address in operation S41.

Thereafter, the storage device performs processes corresponding to a plurality of requests transmitted from the host and transmits packets resulting from the processes to the host. When generating the packets according to the processing result, the storage device detects the type of a packet to be generated in operation S42 and determines whether the packet to be generated requires an access to a data buffer in the host based on the detection result in operation S43.

When it is determined that the packet does not require an access to a data buffer in the host, the packet may be generated without accessing information in an address queue within the storage device. However, when it is determined that the packet requires an access to a data buffer in the host, a buffer address may be read from the address queue in the storage device in operation S44 and a packet containing the buffer address may be generated and transmitted to the host in operation S45.

Figure 17A:
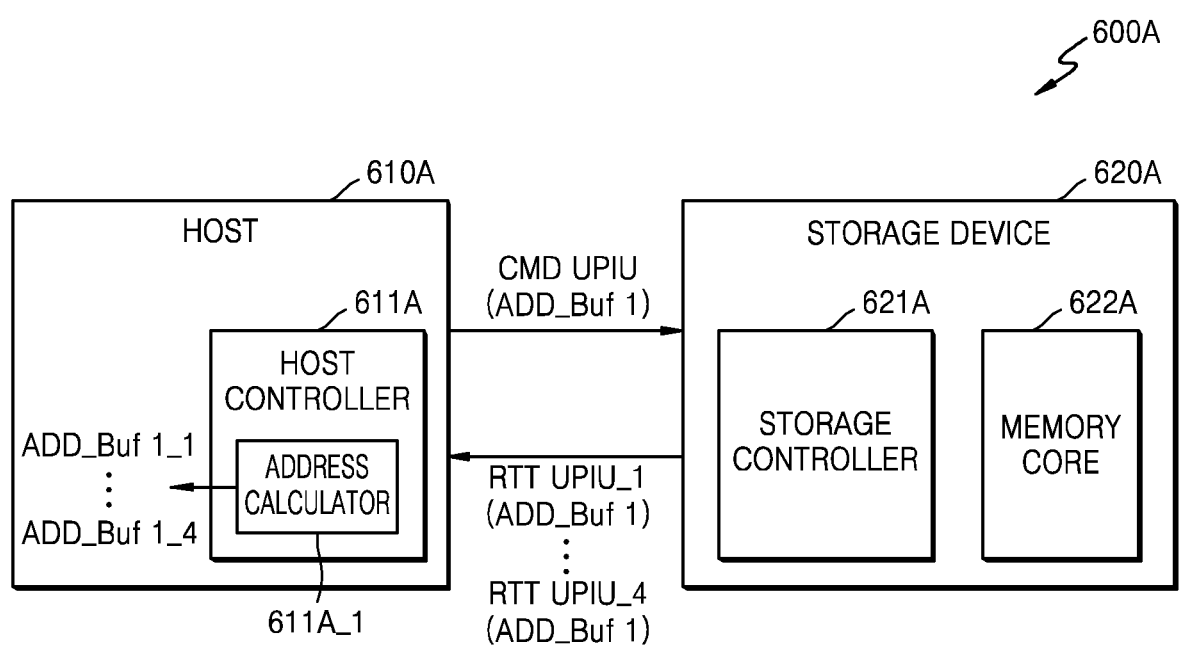
FIGS. 17A through 17C are block diagrams of the operation of a storage system when a plurality of ready-to-transfer (RTT) UFS protocol information units (UPIUs) are transmitted in response to a single command UPIU.
Figure 17B:
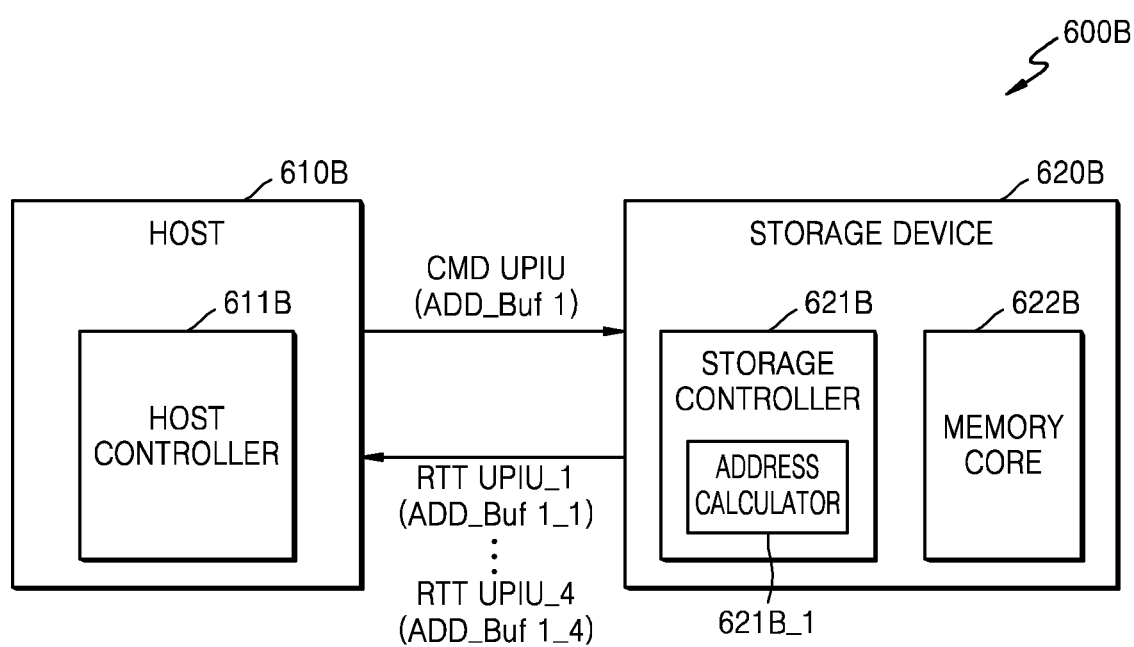
Figure 17C:
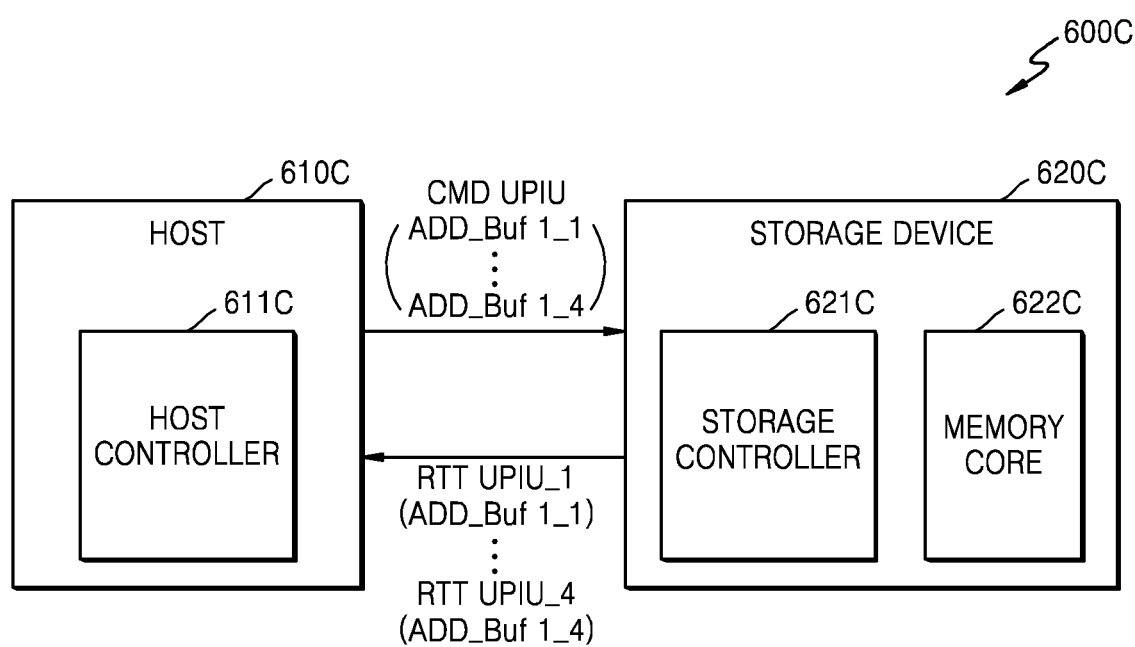

FIGS. 17A through 17C are block diagrams of the operation of a storage system when a plurality of RTT UPIUs are transmitted in response to a single command UPIU. FIGS. 17A through 17C show an example when four RTT UPIUs are transmitted in response to a single command UPIU.

Referring to FIG. 17A, a storage system 600A may include a host 610A and a storage device 620A. The host 610A may include a host controller 611A. The host controller 611A may include an address calculator 611A_1. The storage device 620A may include a storage controller 621A and a memory core 622A.

A buffer address ADD_Buf 1 indicating a location of a data buffer in which write data has been stored may be included in a CMD UPIU. The storage system 600A may include the buffer address ADD_Buf 1 in each of four RTT UPIUs, i.e., RTT UPIU_1 through RTT UPIU_4. Locations of respective data buffers in which write data respectively corresponding to the four RTT UPIUs, i.e., RTT UPIU_1 through RTT UPIU_4, have been stored may be different from one another and the address calculator 611A_1 may calculate buffer addresses ADD_Buf 1_1 through ADD_Buf 1_4 respectively indicating the data buffers corresponding to the four RTT UPIUs, i.e., RTT UPIU_1 through RTT UPIU_4, from the buffer address ADD_Buf 1. The calculation may be performed using the header information, which has been described above, together with the buffer address ADD_Buf 1 included in the RTT UPIUs.

FIG. 17B shows an example in which the above-described address calculation is performed in a storage device. Referring to FIG. 17B, a storage system 600B may include a host 610B and a storage device 620B. The host 610B may include a host controller 611B. The storage device 620B may include a storage controller 621B and a memory core 622B. The storage controller 621B may include an address calculator 621B_1.

The storage controller 621B may receive a CMD UPIU containing the buffer address ADD_Buf 1 and may sequentially transmit four RTT UPIUs, i.e., RTT UPIU_1 through RTT UPIU_4, to the host 610B, taking a write unit into account. The address calculator 621B_1 in the storage controller 621B may calculate the buffer addresses ADD_ Buf 1_1 through ADD_Buf 1_4 using the size of the write unit and the buffer address ADD_Buf 1 which has been parsed. The first buffer address ADD_Buf 1_1 may be included in the first RTT UPIU, i.e., RTT UPIU_1, and the fourth buffer address ADD_Buf 1_4 may be included in the fourth RTT UPIU, i.e., RTT UPIU_4.

FIG. 17C shows an example in which a host transmits a plurality of buffer addresses to a storage device, taking the size of a write unit into account. Referring to FIG. 17C, a storage system 600C may include a host 610C and a storage device 620C. The host 610C may include a host controller 611C. The storage device 620C may include a storage controller 621C and a memory core 622C.

The host 610C may include a plurality of buffer addresses, i.e., ADD_Buf 1_1 through ADD_Buf 1_4, in a single CMD UPIU, taking the size of a write unit of the storage device 620C into account. The storage device 620C may store and manage the plurality of the buffer addresses ADD_Buf 1_1 through ADD_Buf 1_4 which have been received.

The storage device 620C may also sequentially transmit four RTT UPIUs, i.e., RTT UPIU_1 through RTT UPIU_4, to the host 610C and may include a different buffer address in each of the RTT UPIUs. For example, the first buffer address ADD_Buf 1_1 may be included in the first RTT UPIU, i.e., RTT UPIU_1, and the fourth buffer address ADD_Buf 1_4 may be included in the fourth RTT UPIU, i.e., RTT UPIU_4.

Figure 18A:
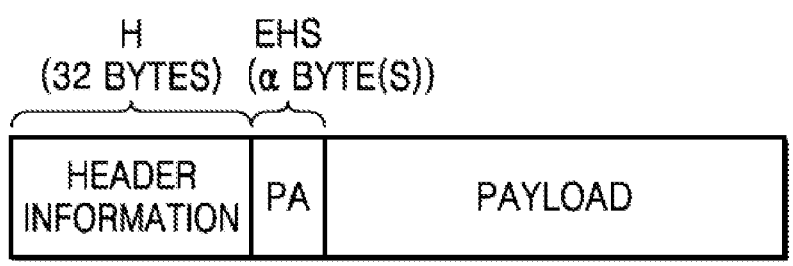
FIG. 18A shows a first type packet containing a buffer address, according to an embodiment of the disclosure.
Figure 18B:
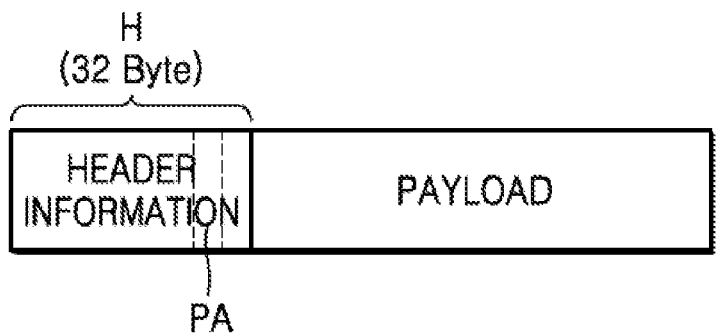
FIG. 18B shows a second type packet that does not contain a buffer address, according to an embodiment of the disclosure.

FIGS. 18A and 18B illustrate structures of a packet according to some embodiments of the disclosure. FIG. 18A shows a first type packet containing a buffer address, and FIG. 18B shows a second type packet not containing a buffer address. Here, the buffer address is included in an extra header segment EHS.

Referring to FIG. 18A, the first type packet may include the header H, the extra header segment EHS, and a payload. Various kinds of header information may be included in the header H. A buffer address corresponding to a PA of a buffer address in a host memory may be included in the extra header segment EHS. Besides the buffer address, other various kinds of information for data management in a storage device may also be included in the extra header segment EHS.

In case of a UFS interface, the header H of a packet may have a predetermined size. For example, the header H may have a size of 32 bytes. The header H may include fields of various kinds of information, such as a LUN, a tag, flags, and a command set type. The size of the extra header segment EHS may vary and information about the size of the extra header segment EHS may be included in one of the fields in the header H. In an embodiment illustrated by FIG. 18A, the extra header segment EHS of the first type packet has a size of a byte(s).

In FIG. 18B, the extra header segment EHS is not included in the second type packet. Accordingly, the size of the second type packet excluding a payload may be fixed to 32 bytes. However, the size of the first type packet excluding a payload may be greater than 32 bytes and vary. Therefore, the size of a packet excluding a payload may vary with the type of packet in some embodiments of the disclosure.

FIGS. 19 through 25 are diagrams of various structures of a packet generated according to some embodiments of the disclosure. It is assumed that a buffer address is included in the extra header segment EHS of a packet. Various fields collectively referred to as an EHS field may be included in the extra header segment EHS. The EHS field may include an EHS header field and an EHS data field.

FIG. 19 shows a CMD UPIU for a data write operation in an embodiment of the disclosure. As shown in FIG. 19, the CMD UPIU may include the header region H and the extra header segment EHS. The header region H may include information about a total EHS length and may also include information about an expected data transfer length.

The extra header segment EHS may include EHS type information EHS_TYPE and EHS length information EHS_LENGTH. The EHS type information EHS_TYPE may be set to a value which varies. When the EHS type information EHS_TYPE is set to a particular value, e.g., 2 h, it may indicate that a buffer address has been included in the extra header segment EHS. In the embodiment shown in FIG. 19, a buffer address corresponding to a PA of a data buffer in which write data has been stored is "0x40C0_0000".

FIGS. 20A and 20B show examples of RTT UPIUs corresponding to the CMD UPIU shown in FIG. 19. FIG. 20A shows the first RTT UPIU, i.e., RTT UPIU_1, and FIG. 20B shows the second RTT UPIU, i.e., RTT UPIU_2. Although not shown, more RTT UPIUs may be transmitted from a storage device to a host according to the size of a write unit.

Referring to FIGS. 20A and 20B, each of the first and second RTT UPIUs, i.e., RTT UPIU_1 and RTT UPIU_2, may include the header region H and the extra header segment EHS. The header region H may include a data buffer offset and data transfer counter information. The extra header segments EHS of the respective first and second RTT UPIUs, i.e., RTT UPIU_1 and RTT UPIU_2, may include the same value, e.g., "0x40C0_0000" for a buffer address.

The host may determine the location of a data buffer storing the write data using information in the header region H and the extra header segment EHS included in each of the first and second RTT UPIUs, i.e., RTT UPIU_1 and RTT UPIU_2. For example, the host may determine the location of the data buffer using the data buffer offset, the data transfer counter information, and the buffer address and may transmit corresponding write data to the storage device.

FIGS. 21A and 21B show other examples of RTT UPIUs corresponding to the CMD UPIU shown in FIG. 19. FIG. 21A shows the first RTT UPIU, i.e., RTT UPIU_1, and FIG. 21B shows the second RTT UPIU, i.e., RTT UPIU_2. Redundant descriptions the same as those explained above with reference to FIGS. 20A and 20B will be omitted.

Referring to FIG. 19 and FIGS. 21A and 21B, a storage device may calculate a plurality of buffer addresses using a buffer address (e.g., 0x40C0_0000) contained in a CMD UPIU and may include the buffer addresses in a plurality of RTT UPIUs, respectively. Buffer addresses having different values may be included in a plurality of RTT UPIUs. For example, a buffer address corresponding to 0x40C0_0000 may be included in the first RTT UPIU, i.e., RTT UPIU_1, and a buffer address corresponding to 0x40C0_8000 may be included in the second RTT UPIU, i.e., RTT UPIU_2. According to embodiments show in FIGS. 21A and 21B, a host may directly access a data buffer at the location indicated by a buffer address contained in an RTT UPIU, without performing a calculation operation on the buffer address contained in the RTT UPIU.

FIGS. 22 through 25 show examples in which a host includes a plurality of buffer addresses in a single CMD UPIU. Embodiments illustrated in FIGS. 22 through 25 may be applied when a plurality of write units of data requested to be written are continuously or discontinuously located in a buffer area. It would be more efficient to apply the embodiments to cases where write units of data are discontinuously located in a buffer area. The structure and information of a header region used in the embodiments described with reference to FIGS. 22 through 25 are the same as or similar to those described above and thus not illustrated in FIGS. 22 through 25.

Figure 22:
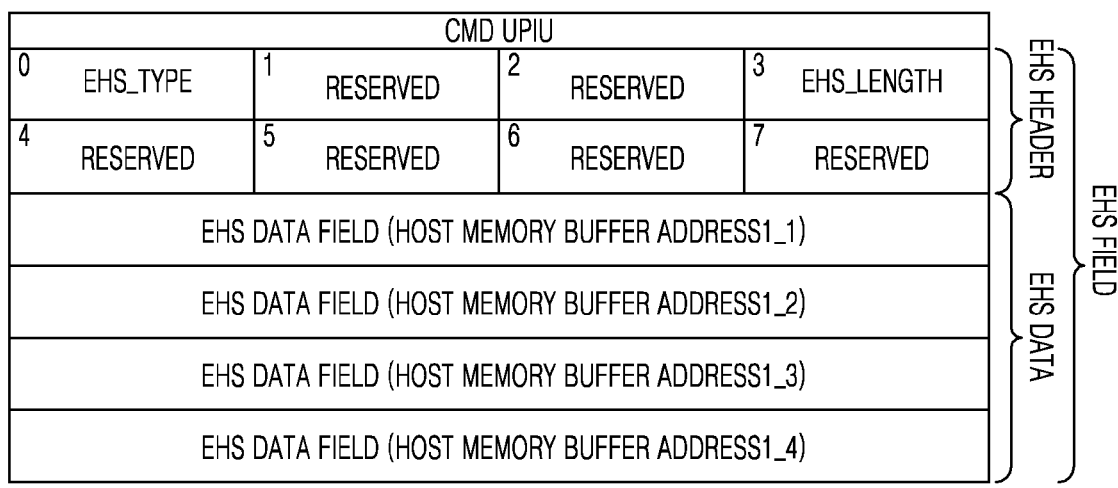
FIG. 22 shows an example in which an extra header segment (EHS) field included in a CMD UPIU may include an EHS header and an EHS data according to an embodiment of the disclosure.

Referring to FIG. 22, an EHS field included in a CMD UPIU may include an EHS header and an EHS data. The EHS header may include the type information EHS_TYPE and the length information EHS_LENGTH, as described above. When data corresponding to the size of a write unit is transmitted four times from the host to a storage device in response to a single CMD UPIU, buffer addresses, i.e., BUFFER ADDRESS1_1 through BUFFER ADDRESS1_4, at which four data having the size of the write unit are respectively located, may be included in the EHS field. The storage device may store and manage the buffer addresses, i.e., BUFFER ADDRESS1_1 through BUFFER ADDRESS1_4.

Figure 23A:
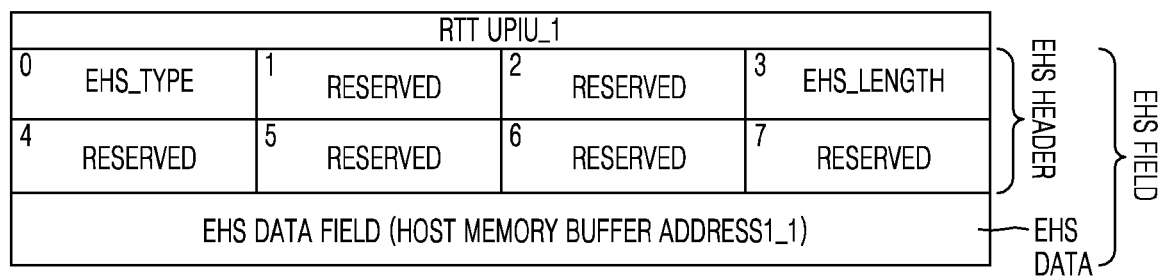
FIG. 23A shows an RTT UPIU transmitted by a storage device according to an embodiment of the disclosure.
Figure 23B:
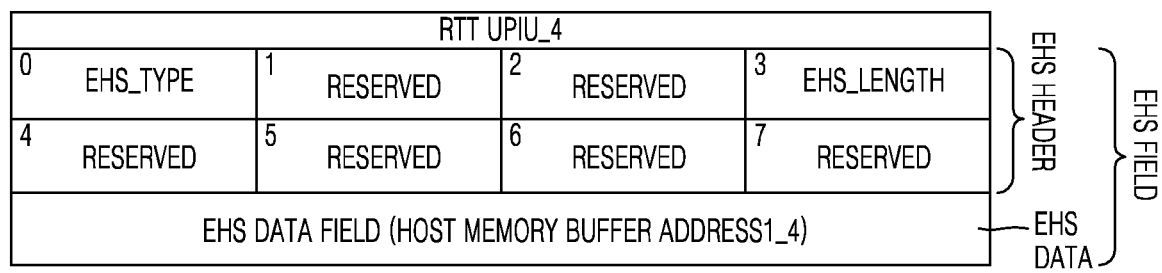
FIG. 23B shows an RTT UPIU transmitted by a storage device according to another embodiment of the disclosure.

FIGS. 23A and 23B show RTT UPIUs transmitted by a storage device. FIG. 23A shows the first RTT UPIU, i.e., RTT UPIU_1, and FIG. 23B shows the fourth RTT UPIU, i.e., RTT UPIU_4. Referring to FIG. 23A, an EHS field of the first RTT UPIU, i.e., RTT UPIU_1, may contain the first buffer address, i.e., BUFFER ADDRESS1_1. The host may parse the first buffer address, i.e., BUFFER ADDRESS1_1, from the first RTT UPIU, i.e., RTT UPIU_1, and may transmit data, which has the size of a write unit and corresponds to the first buffer address, i.e., BUFFER ADDRESS1_1, to the storage device. Referring to FIG. 23B, an EHS field of the fourth RTT UPIU, i.e., RTT UPIU_4, may contain the fourth buffer address, i.e., BUFFER ADDRESS1_4, having a different value than the first buffer address, i.e., BUFFER ADDRESS1_1. A host may transmit data corresponding to the fourth buffer address, i.e., BUFFER ADDRESS1_4, to the storage device.

Figure 24:
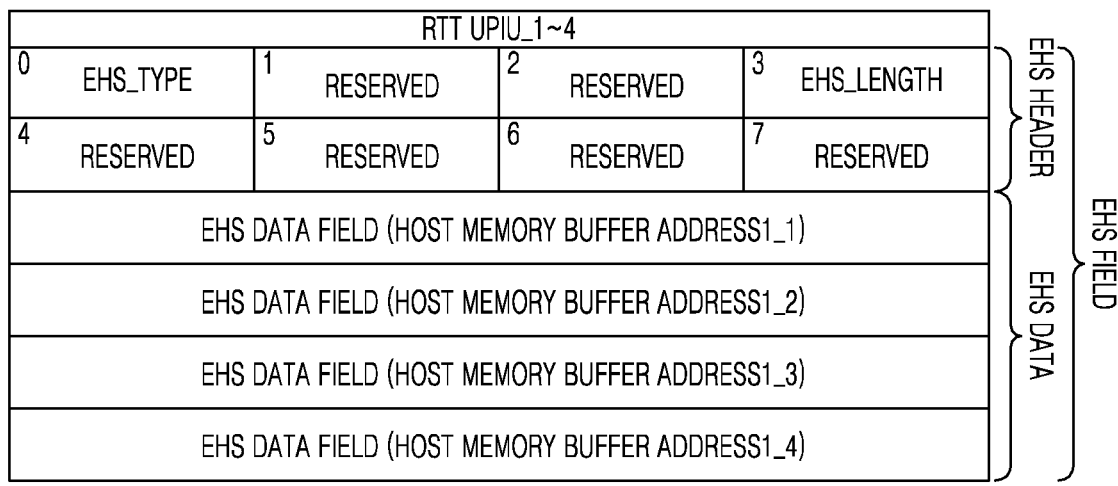
FIG. 24 shows an RTT UPIU containing first through fourth buffer addresses according to another embodiment of the disclosure.

FIG. 24 shows a modifiable embodiment in which an RTT UPIU contains first through fourth buffer addresses, i.e., BUFFER ADDRESS1_1 through BUFFER ADDRESS1_4. All of the first through fourth buffer addresses, i.e., BUFFER ADDRESS1_1 through BUFFER ADDRESS1_4, may be included in each of the first through fourth RTT UPIUs, i.e., RTT UPIU_1 through RTT UPIU_4. The host may access data selectively using one of the buffer addresses according to information in the header.

Figure 25:
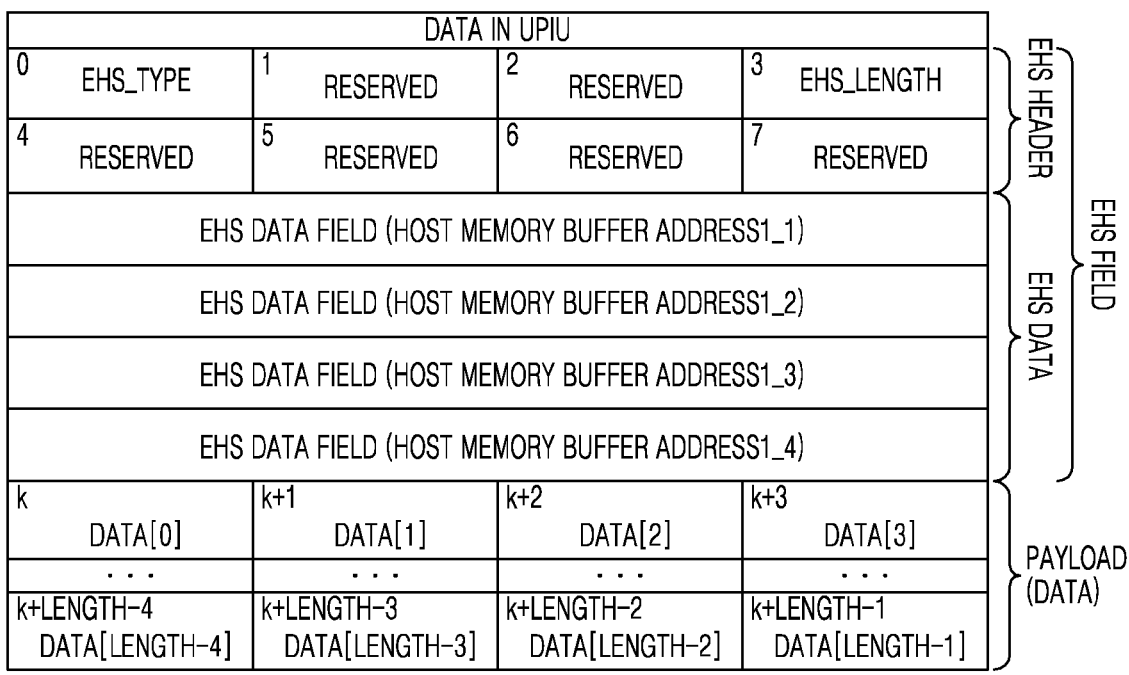
FIG. 25 shows an example of a UPIU according to another embodiment of the disclosure.

FIG. 25 shows an example of a data_in UPIU. It is assumed that the CMD UPIU shown in FIG. 22 requests a read operation.

The storage device may store and manage a plurality of buffer addresses, i.e., BUFFER ADDRESS1_1 through BUFFER ADDRESS1_4, contained in a CMD UPIU corresponding to a read request. When transmitting a data_in UPIU in response to the CMD UPIU, the storage device may include the buffer addresses, i.e., BUFFER ADDRESS1_1 through BUFFER ADDRESS1_4, in the data_in UPIU. The host may store read data at corresponding locations of data buffers in a host memory using the buffer addresses, i.e., BUFFER ADDRESS1_1 through BUFFER ADDRESS1_4, contained in the data_in UPIU.

According to the embodiments of the disclosure, a buffer address indicating a location of a data buffer in a host is transferred between the host and a storage device, and therefore, a read operation performed by a host memory to determine the location of the data buffer needed to be accessed can be eliminated. As a result, overhead of data processing between the host and the storage device is reduced and data processing performance is increased.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to embodiments thereof, it will be understood that various changes in form and details may be made therein without departing from the spirit and scope of the following claims.

What is claimed is:

1. A storage device comprising:
a nonvolatile memory; and
a controller coupled to the nonvolatile memory, wherein the controller is configured to:
receive a first command and a first address from an external device,
transmit first data corresponding to the first command and the first address to the external device,
receive a second command and a second address from the external device, and
transmit the second address and a request for second data corresponding to the second command to the external device.

2. The storage device of claim 1, wherein the first command is a read command, and the second command is a write command.

3. The storage device of claim 2, wherein the first data is read from the nonvolatile memory.

4. The storage device of claim 2, wherein the controller is further configured to: receive the second data from the external device, and
store the second data in the nonvolatile memory.

5. The storage device of claim 1, wherein the first address indicates a first location of a data buffer in the external device in which the first data is to be stored, and
the second address indicates a second location of the data buffer in the external device in which the second data is stored.

6. The storage device of claim 1, wherein the storage device is an embedded multi-media card (eMMC) or an embedded universal flash storage (UFS) memory device.

7. The storage device of claim 1, wherein the controller is further configured to communicate with the external device via a universal flash storage (UFS) interface.

8. The storage device of claim 1, wherein the first command and the first address are included in a first packet that is a UFS protocol information unit (UPIU).

9. A storage device comprising:
a nonvolatile memory; and
a controller coupled to the nonvolatile memory, wherein the controller is configured to:
receive a first packet including a read command and a first address from an external device,
read first data stored in the nonvolatile memory, and
transmit a second packet including the first address and the first data corresponding to the read command to the external device,
wherein the controller communicates with the external device via a universal flash storage (UFS) interface, and
each of the first packet and the second packet is a UFS protocol information unit (UPIU).

10. The storage device of claim 9, wherein the first address indicates a first location of a data buffer in the external device in which the first data is to be stored.

11. The storage device of claim 9, wherein the controller is further configured to:
receive a third packet including a write command and a second address from the external device, and
transmit a fourth packet including the second address and a request for second data corresponding to the write command to the external device.

12. The storage device of claim 11, wherein the second address indicates a second location of a data buffer in the external device in which the second data is stored.

13. The storage device of claim 9, wherein the storage device is an embedded multi-media card (eMMC) or an embedded universal flash storage (UFS) memory device.

14. The storage device of claim 9, wherein the controller is further configured to control a data write operation and a data read operation on the nonvolatile memory according to a UFS interface protocol.

15. A storage device comprising:
a nonvolatile memory; and
a controller coupled to the nonvolatile memory, wherein the controller is configured to:
receive a first packet including a write command and a first address from an external device, and
transmit a second packet including the first address and a request for first data corresponding to the write command to the external device,
wherein the controller communicates with the external device via a universal flash storage (UFS) interface, and wherein
each of the first packet and the second packet is a UFS protocol information unit (UPIU).

16. The storage device of claim 15, wherein the first address indicates a first location of a data buffer in the external device in which the first data is stored.

17. The storage device of claim 15, wherein the controller is further configured to:
receive a third packet including a read command and a second address from the external device,
read second data stored in the nonvolatile memory, and
transmit a fourth packet including the second address and the second data corresponding to the read command to the external device.

18. The storage device of claim 17, wherein the second address indicates a second location of a data buffer in the external device in which the second data is to be stored.

19. The storage device of claim 15, wherein the storage device is an embedded multi-media card (eMMC) or an embedded universal flash storage (UFS) memory device.

20. The storage device of claim 15, wherein the controller is further configured to control a data write operation and a data read operation on the nonvolatile memory according to a UFS interface protocol.

* * * * *